(12) United States Patent
Talebpour et al.

(10) Patent No.: US 11,643,212 B2
(45) Date of Patent: May 9, 2023

(54) MONUMENT FIXTURES

(71) Applicant: THE BOEING COMPANY, Chicago, IL (US)

(72) Inventors: Sougand Talebpour, Lake Stevens, WA (US); Roland Mair, Kenmore, WA (US); Russell W. Keck, Seattle, WA (US); Tomas Armenta, Lake Stevens, WA (US); Paul T. Bridgeman, Bothell, WA (US); Franco M. Cagnina, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 1066 days.

(21) Appl. No.: 16/186,825

(22) Filed: Nov. 12, 2018

(65) Prior Publication Data

US 2019/0077511 A1    Mar. 14, 2019

Related U.S. Application Data

(63) Continuation of application No. 15/199,584, filed on Jun. 30, 2016, now Pat. No. 10,124,897.

(51) Int. Cl.
*B64D 11/04* (2006.01)
*B64C 1/14* (2006.01)
(Continued)

(52) U.S. Cl.
CPC ............ *B64D 11/04* (2013.01); *B64C 1/1461* (2013.01); *B64D 11/02* (2013.01); *B64D 2011/0046* (2013.01)

(58) Field of Classification Search
CPC ........ B64D 11/04; B64D 11/02; B64C 1/1461
See application file for complete search history.

(56) References Cited

U.S. PATENT DOCUMENTS

| | | | | |
|---|---|---|---|---|
| 4,795,047 A | * | 1/1989 | Dunwoodie | ........... B65D 88/14 220/1.5 |
| 4,993,574 A | * | 2/1991 | King | ...................... B65D 88/14 220/1.5 |

(Continued)

OTHER PUBLICATIONS

The FloorMat Store, "Wall GUard Installation-W8 E-Clip System," Available:http://www.floormat-store.com/wall-guards/wall-guard-installation-w8c.htm-l.
(Continued)

*Primary Examiner* — Valentina Xavier
(74) *Attorney, Agent, or Firm* — Patterson + Sheridan, LLP

(57) ABSTRACT

A frame member, a monument for a vehicle, and a vehicle are provided. The frame member includes an extrusion that has a spar with first and second opposing surfaces and first and second opposing ends. The spar includes a first retention lip extending from the first planar surface along the first end at an acute angle relative to the first planar surface. The spar includes a rub strip protrusion extending from the first planar surface between the first and second ends. The rub strip protrusion includes a third end and a second retention lip extending from a third surface facing the first retention lip. The second retention lip and the third surface form an acute angle. The extrusion also includes at least two panel protrusions extending from the second planar surface of the spar. A rub strip can include retention tabs with outward-facing notches that engage the first and second retention lips.

20 Claims, 16 Drawing Sheets

(51) Int. Cl.
B64D 11/02 (2006.01)
B64D 11/00 (2006.01)

(56) References Cited

U.S. PATENT DOCUMENTS

| | | | | |
|---|---|---|---|---|
| 5,336,849 | A * | 8/1994 | Whitney | E04F 17/08 |
| | | | | 174/101 |
| 5,942,729 | A * | 8/1999 | Carlson, Jr. | H02G 3/0418 |
| | | | | 174/68.1 |
| 7,612,300 | B2 * | 11/2009 | Owens | H02G 3/0437 |
| | | | | 174/480 |
| 7,615,710 | B2 * | 11/2009 | Sayres | H02G 3/0418 |
| | | | | 174/480 |
| 7,829,797 | B2 * | 11/2010 | VanderVelde | H02G 3/128 |
| | | | | 174/72 R |
| 8,047,467 | B2 * | 11/2011 | Erickson | B64D 11/0015 |
| | | | | 244/118.1 |
| 8,710,369 | B2 * | 4/2014 | Krietzman | H05K 5/0247 |
| | | | | 174/68.3 |
| 9,546,486 | B2 * | 1/2017 | DesJardins, Jr. | E06B 9/52 |
| 9,700,965 | B2 * | 7/2017 | Bornemann | B23K 9/32 |
| 10,124,897 | B2 | 11/2018 | Talebpour et al. | |
| 10,862,283 | B1 * | 12/2020 | Hansen | H02G 3/283 |
| 2009/0278429 | A1 * | 11/2009 | Erickson | B64D 11/04 |
| | | | | 312/265.1 |
| 2017/0190424 | A1 | 7/2017 | Brown | |
| 2017/0291725 | A1 * | 10/2017 | Abelon | B64F 5/50 |
| 2018/0037324 | A1 | 2/2018 | Young | |
| 2018/0170547 | A1 | 6/2018 | Savian | |

OTHER PUBLICATIONS

Hans Beck, "1800 and 1800i Wall Guards," 2013. Available: http://www.hansbeck.dk/1800-and-1800i-wall-guards.html.
Hans Beck, "700 and 700i Wall Guards," 2013. Available: http://www.hansbeck.dk/700-and-700i-wall-guards.html.

* cited by examiner

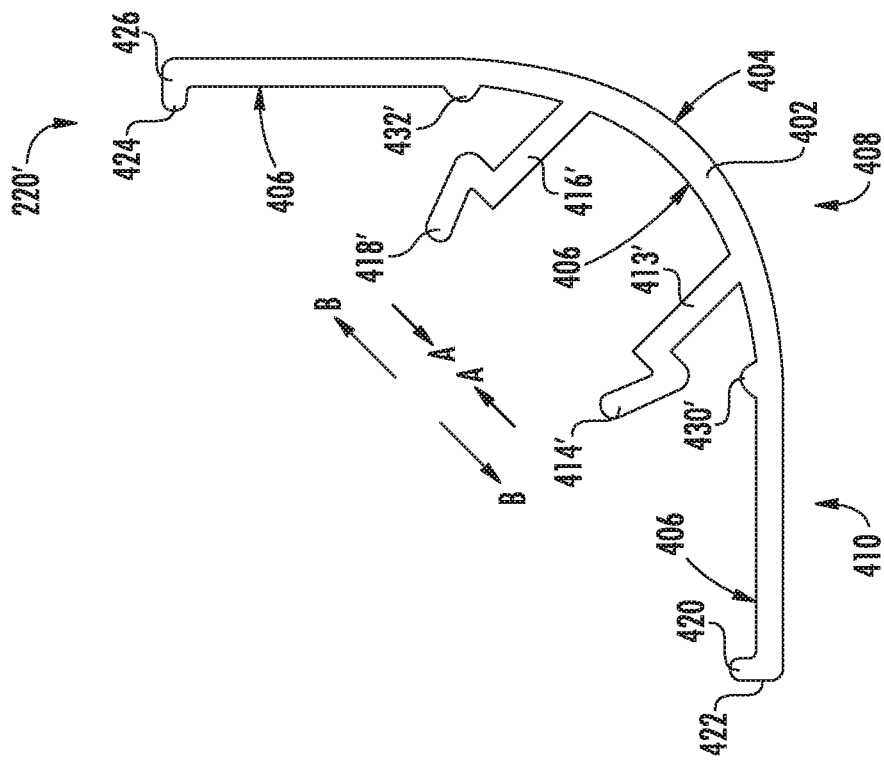
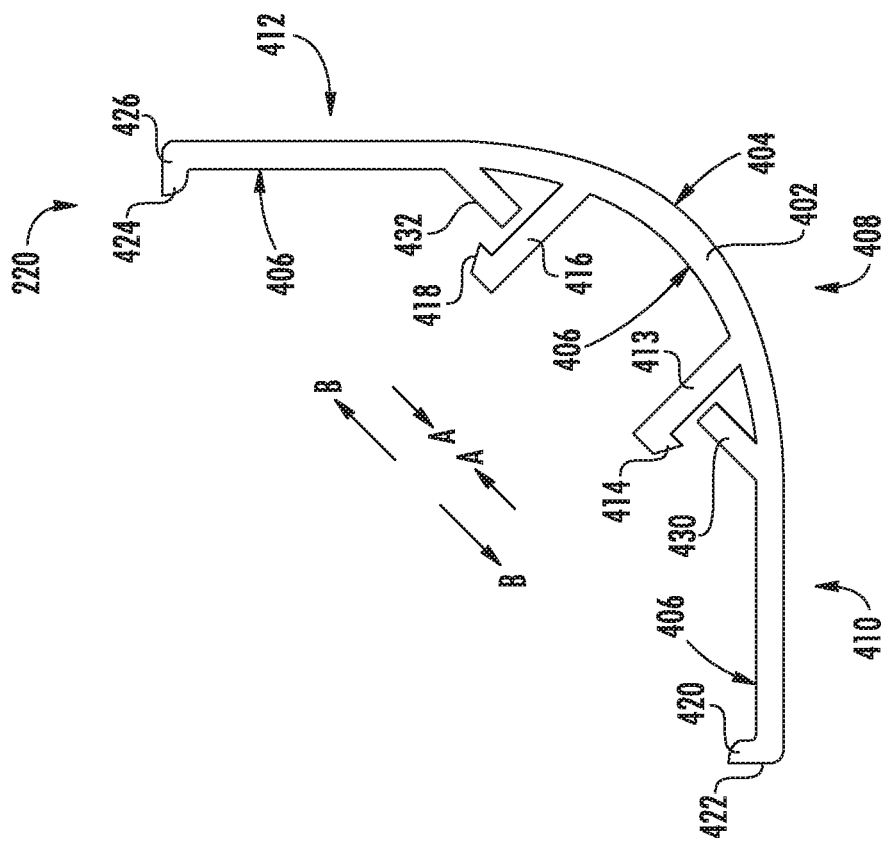

MONUMENT FIXTURES

CROSS-REFERENCE TO RELATED APPLICATIONS

This application is a continuation of U.S. patent application Ser. No. 15/199,584, filed Jun. 30, 2016, issued as U.S. patent Ser. No. 10/124,897, which is herein incorporated by reference.

BACKGROUND

Monuments are typically included in vehicles, such as aircraft, buses, and ships, to provide closets, lavatories, galleys, partitions, and other structures. In such vehicles, space is typically at a premium, and such monuments are subject to impacts by passengers, luggage, drink carts, and other objects on board the vehicle. To protect the monuments from damage and unsightly blemishes, the monuments often have rub strips affixed at strategic spots. For example, a monument may include rub strips at floor level to protect against kicks (i.e., a kick strip), rub strips several feet above the floor to protect against impacts from carts and luggage, and vertical rub strips arranged at corners.

SUMMARY

According to one aspect, frame member for a vehicle monument includes an extrusion. The extrusion includes a spar. The spar includes a first planar surface and an opposing second planar surface arranged between a first end and an opposing second end. The spar includes a first retention lip protruding from the first planar surface such that the first planar surface and the first retention lip form an acute angle. The extrusion also includes a rub strip protrusion extending from the first planar surface of the spar at a location between the first end and the second end. The rub strip protrusion terminates at a third end. The rub strip protrusion includes a third surface facing the first end of the spar. The rub strip protrusion also includes a second retention lip protruding from the third surface such that the third surface and the second retention lip form an acute angle. The first retention lip and the second retention lip define a window that can receive retention tabs of a rub strip therethrough.

According to one aspect, monument for a vehicle includes an extrusion. The extrusion includes a spar. The spar includes a first planar surface and an opposing second planar surface arranged between a first end and an opposing second end. The spar includes a first retention lip protruding from the first planar surface such that the first planar surface of the spar and the first retention lip form an acute angle. The extrusion also includes a rub strip protrusion extending from the first planar surface of the spar at a location between the first end and the second end. The rub strip protrusion terminates at a third end. The rub strip protrusion includes a third surface facing the first end of the spar. The rub strip protrusion also includes a second retention lip protruding from the third surface such that the third surface of the rub strip protrusion and the second retention lip form an acute angle. The first retention lip and the second retention lip define a window that can receive retention tabs of a rub strip therethrough. The monument also includes a wall panel abutting to the second planar surface of the spar.

According to one aspect, a vehicle includes a monument that includes an extrusion. The extrusion includes a spar. The spar includes a first planar surface and an opposing second planar surface arranged between a first end and an opposing second end. The spar includes a first retention lip arranged along the first end of the spar and protruding from the first planar surface such that the first planar surface of the spar and the first retention lip form an acute angle. The extrusion also includes a rub strip protrusion extending from the first planar surface of the spar at a location between the first end and the second end. The rub strip protrusion terminates at a third end. The rub strip protrusion includes a third surface facing the first end of the spar. The rub strip protrusion also includes a second retention lip arranged along the third end and protruding from the third surface such that the third surface of the rub strip protrusion and the second retention lip form an acute angle. The first retention lip and the second retention lip define a window that can receive retention tabs of a rub strip therethrough. The extrusion also includes at least two panel protrusions extending from the second planar surface of the spar. The monument also includes a wall panel attached to the at least two panel protrusions.

BRIEF DESCRIPTION OF ILLUSTRATIONS

FIG. 4A is an end view of the vertical rub strip illustrated in FIG. 2;

FIG. 4B is an end view of a variation of the vertical rub strip illustrated in FIG. 2;

Figure 11A:
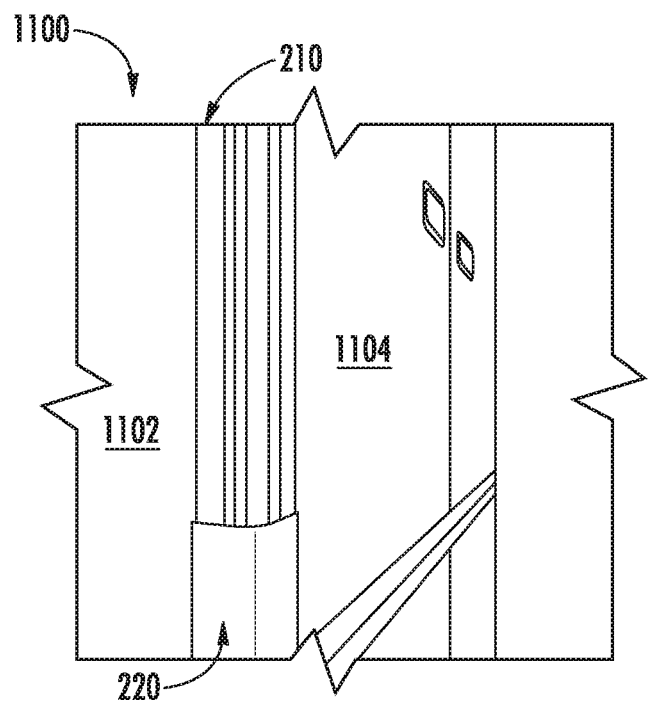
FIG. 11A is a perspective view of an exterior corner of a closet after a first step of a process, according to one embodiment, in which a vertical rub strip according to the aspect depicted in FIG. 4 has been installed along a partial length of the extrusion according to the aspect depicted in FIG. 3.
Figure 12A:
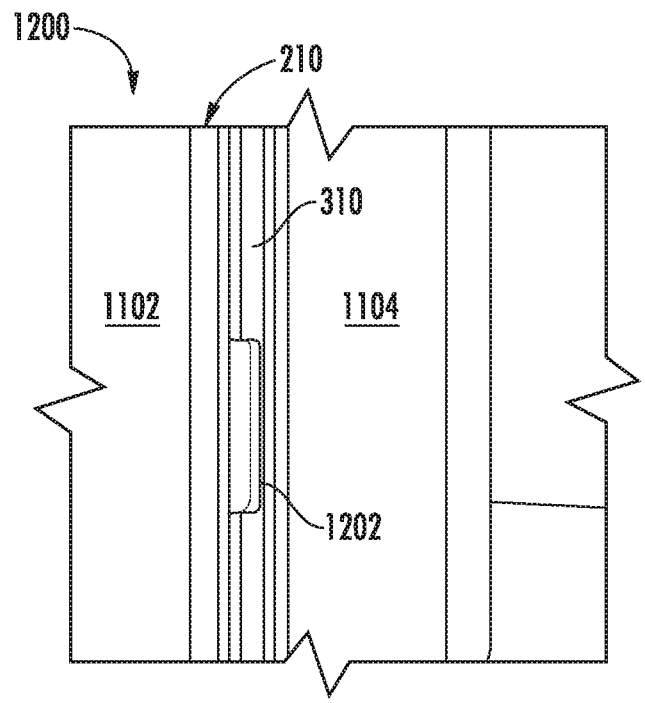
FIG. 12A is a perspective view of an exterior corner of a closet after a first step of a process, according to one embodiment, in which an extrusion according to the aspect depicted in FIG. 3 has been installed with a slot formed in the extrusion.
Figure 12B:
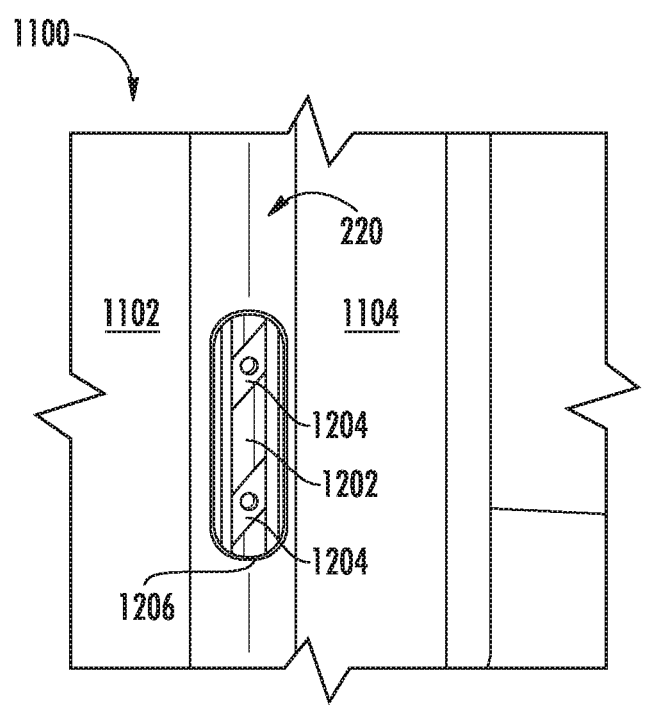
Figure 12C:
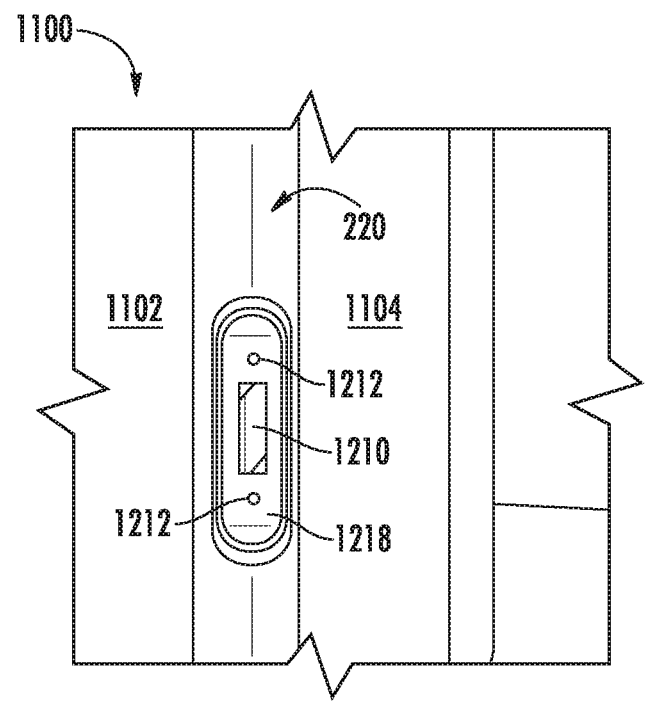
Figure 12D:
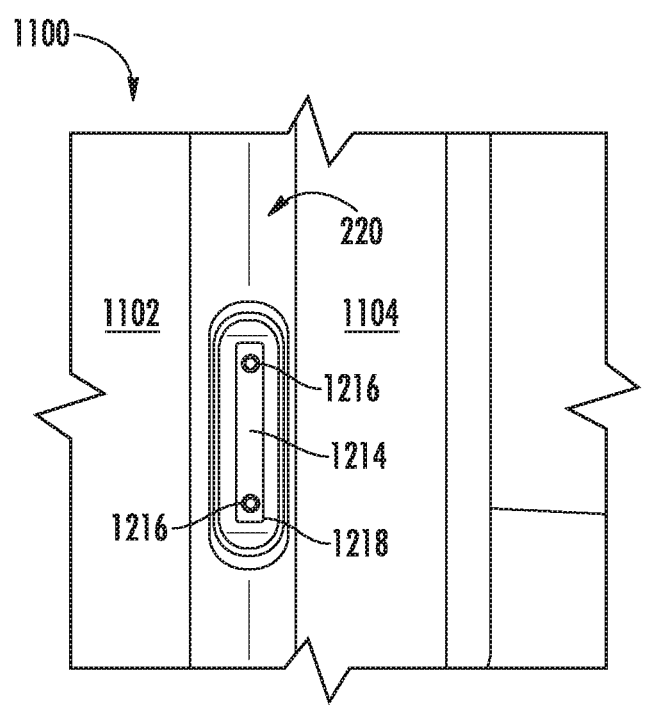

FIG. 12B is a perspective view of the exterior corner of the closet of FIG. 12A after a second step of a process, according to one embodiment, in which brackets have been installed into the extrusion proximal to the slot formed in the extrusion and in which a vertical rub strip according to the aspect depicted in FIG. 4 has been installed along the length of the extrusion, and wherein the vertical rub strip includes an aperture therethrough aligned with the slot in the extrusion;

FIG. 12C is a perspective view of the exterior corner of the closet of FIG. 12A after a third step of a process, according to one embodiment, in which a light fixture has been installed onto the extrusion and the bracket through the aperture in the vertical rub strip of FIG. 12B; and FIG. 12D is a perspective view of the exterior corner of the closet of FIG. 11A after a fourth step of a process, according to one embodiment, in which a light source has been installed onto the light fixture of FIG. 12C.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Monuments are typically included in passenger compartments of vehicles, such as aircraft, buses, and ships, to provide closets, lavatories, galleys, partitions, and other structures. In such vehicles, space is typically at a premium, and such monuments are subject to impacts by passengers, luggage, drink carts, and other objects on board the vehicle. To protect the monuments from damage and unsightly blemishes, the monuments typically include rub strips affixed at strategic spots. For example, a monument may include rub strips at floor level to protect against kicks, rub strips several feet above the floor to protect against impacts from carts and luggage, and vertical rub strips arranged at corners.

Figure 1:
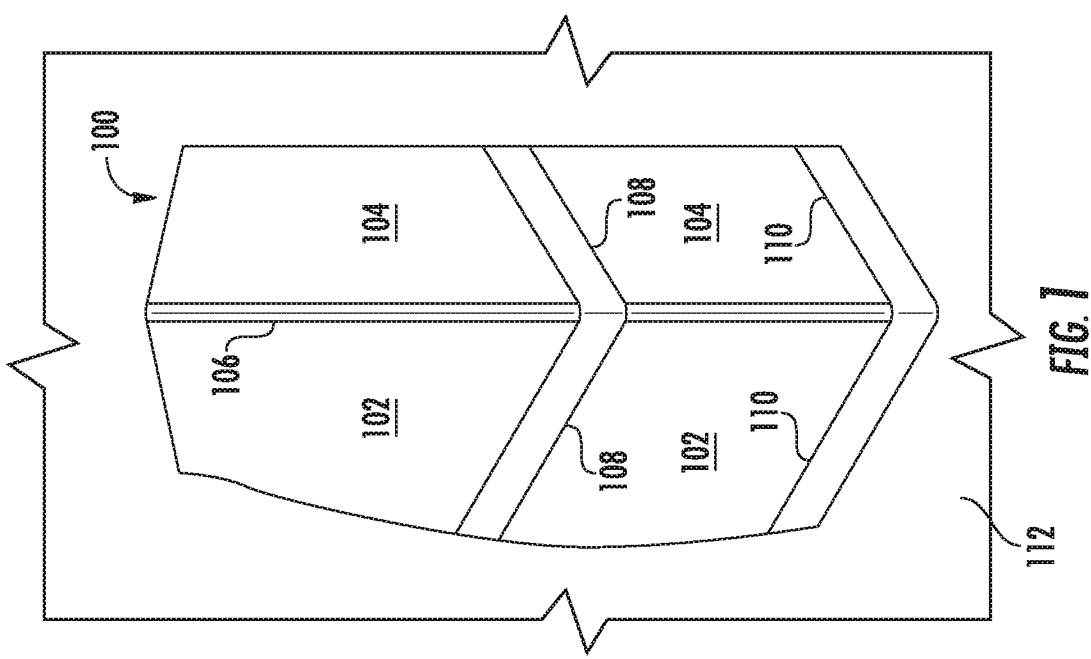
FIG. 1 is a perspective view of a closet for a vehicle that includes horizontal rub strips and a vertical rub strip according to various aspects.

FIG. 1 is a perspective view of a monument 100 arranged on a floor 112 in a passenger compartment of a vehicle, such as an aircraft. The monument 100 includes a wall 102 and a door 104. The monument 100 includes a vertical rub strip arranged at a corner 106 between the wall 102 and the door 104. Horizontal rub strips (i.e., wall guards) are disposed along the wall 102 and the door 104 at a location 110 adjacent to the floor 112. The monument 100 also includes horizontal rub strips (i.e., wall guards) 108 along the wall 102 and the door 104 positioned at a location 108 spaced apart from the floor 112 (e.g., 3 feet or 1 meter from the floor).

Such rub strips typically were attached to the monument 100 using discrete fasteners, such as tabs on the rub strips that fit into slots in the monument 100. Significant processing (e.g., trimming and fitting) may be needed during installation of such rub strips (e.g., to fit around doorways), which increases the amount of time to install the rub strips. Additionally, such rub strips typically included several exposed seams. The exposed seams could be unsightly and could also trap dirt or other debris.

In aspects described herein, vertical and horizontal rub strips (or rub strip arranged in other orientations), and systems for affixing such rub strips to a monument, are disclosed. In the various aspects, a reduced amount of processing is performed to install the rub strips. Additionally, the installed rub strips have a reduced number of exposed seams.

Figure 2:
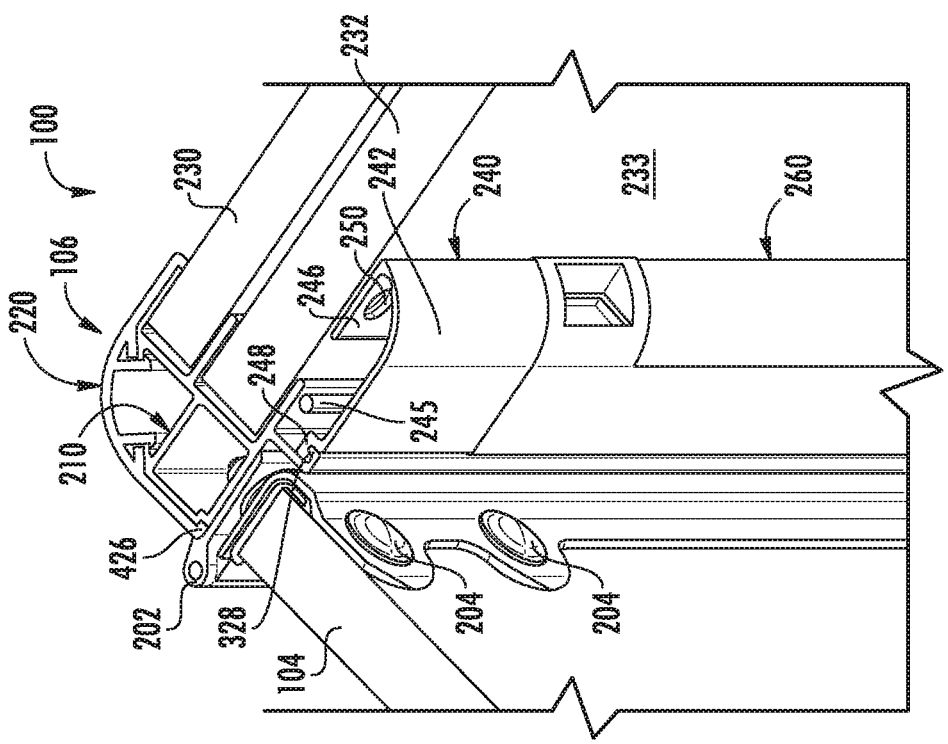
FIG. 2 is a perspective cross-sectional view of an interior corner of a closet that includes a vertical rub strip and extrusion according to at least one aspect.

FIG. 2 is a perspective cross-sectional view of an interior of a corner 106 of the monument 100, such as a closet, that includes a door 104. The corner 106 of the monument 100 includes an extrusion 210 according to one aspect that supports a hinge 202 to which the door 104 is attached (e.g., via fasteners 204). The extrusion 210 also supports wall panels 230 and 232. In the aspect shown in FIG. 2, the monument includes an interior wall panel 232 and an exterior wall panel 230. The exterior wall panel 232 could be specific to a particular vehicle or vehicle operator and it could include a decorative design or color on an outward-facing surface that matches and/or complements other interior details of the vehicle. The interior wall panel 230 could be standardized across all similar monuments. In various other aspects, the monument could include a single wall panel in place of the two wall panels 230 and 232 illustrated in FIG. 2. The monument optionally includes a light fixture 260 arranged in the interior of the corner and abutting a wire raceway 240. Wiring 245 can be routed to the light fixture 260 (and optionally to other equipment) via the wire raceway 240. The wire raceway 240 includes a visible cover 242 and a surface 246 abutting an interior-facing surface 233 of the interior wall panel 232. The surface 246 can include fastener holes 250 that can receive fasteners (e.g., rivets, bolts, or plugs) to affix the surface 246 to the interior wall panel 232. The visible cover 242 also includes a flange 248 that can engage a retention hook 328 (discussed in greater detail with respect to FIG. 3, below) of the extrusion 210. The visible cover 242 of the wire raceway 240 can be made of a resilient material (such as a nylon material) that is flexible such that an installer can bend the visible cover 242 away from the interior wall panel 232 to install fasteners through the fastener holes 250 of the surface 246. Thereafter, the installer can push the visible cover 242 such that the flange 248 engages the retention hook 328 of the extrusion 210. The corner 106 of the monument 100 also includes a vertical rub strip 220 engaged with the extrusion 210 according to one aspect.

Figure 3B:
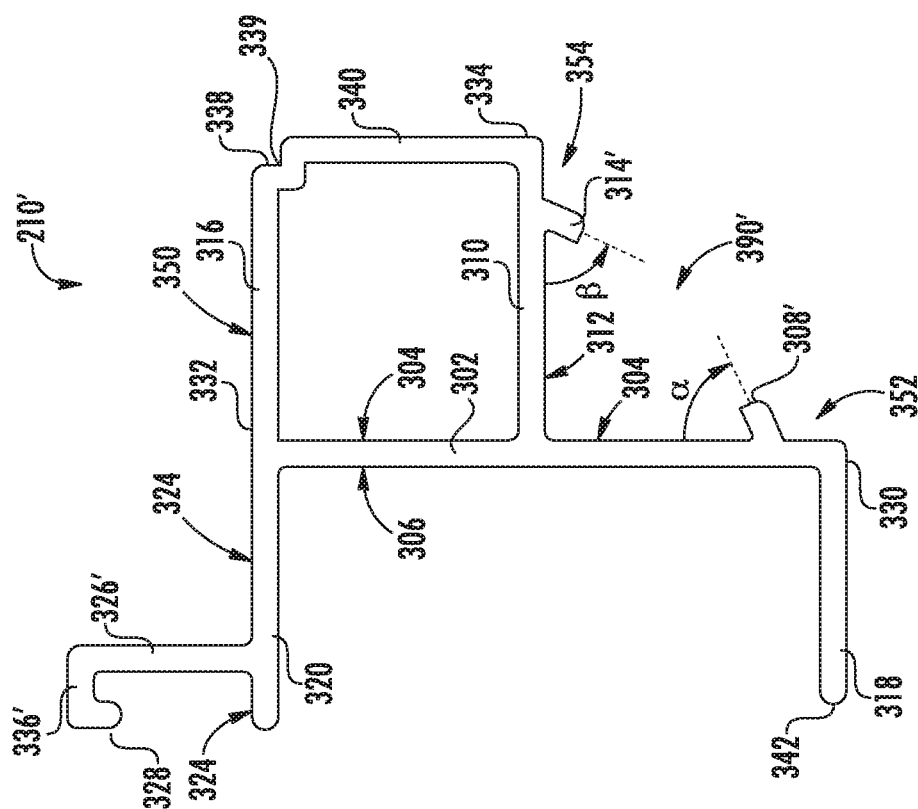
FIG. 3B is an end view of a variation of the extrusion illustrated in FIG. 2.
Figure 3A:
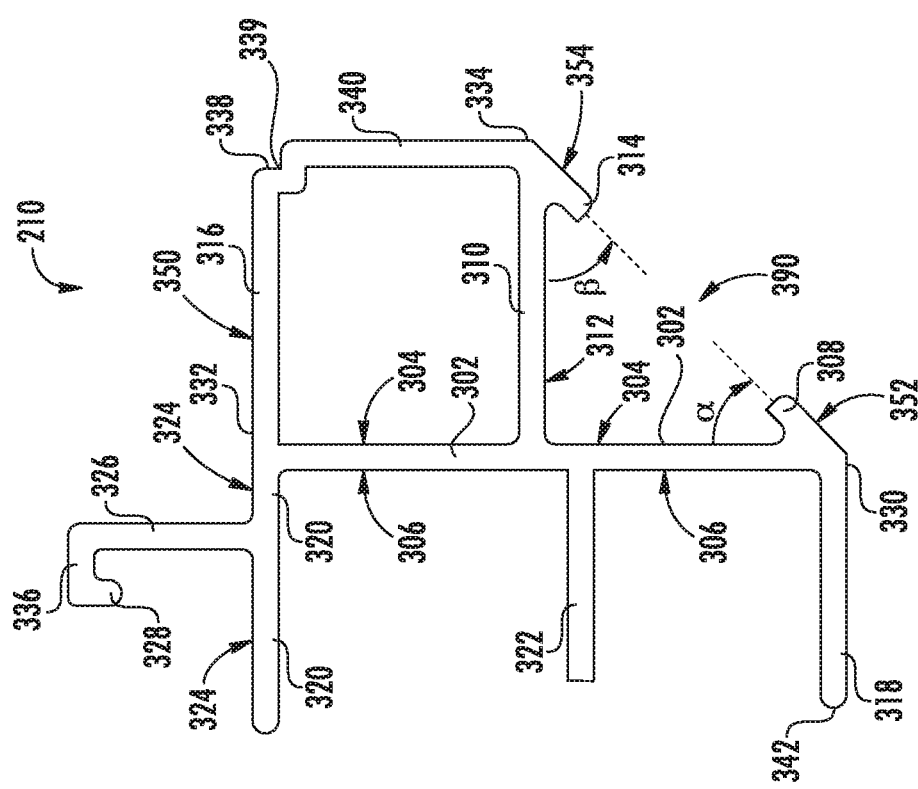
FIG. 3A is an end view of the extrusion illustrated in FIG. 2.

FIG. 3A is an end view of the extrusion 210 depicted in FIG. 2. An extrusion has a constant cross-sectional profile along a lengthwise direction of the extrusion. After an extrusion has been formed, holes, slots, or the like can be formed at specific locations in the extrusion through drilling or other machining procedures. In the subsequent description of the extrusion shown in FIG. 3A, the cross-sectional profile along the lengthwise direction (i.e., into and out of the page) is constant except where described otherwise. Furthermore, in the subsequent description of the extrusion, the described features are in directions perpendicular to the lengthwise direction. Referring to FIG. 3A, the extrusion 210 includes a spar 302 that includes a first planar surface 304 and a second planar surface 306 on opposing side from the first planar surface 304. The spar 302 includes a first end 330 and a second opposing end 332. The first planar surface 304 and the second planar surface 306 span between the first end 330 and the second end 332.

The spar 302 includes a first retention lip 308 arranged along the first end 330 and protruding from the first planar surface 304 of the spar 302, such that the first retention lip 308 and the first planar surface 304 of the spar 302 form an acute angle α. In one aspect, the angle α is between 30° and 85°. In another aspect, the angle α is between 40° and 50°. In another aspect, the angle α is 45°.

The extrusion 210 also includes a rub strip protrusion 310 extending from the first planar surface 304 of the spar 302 at a location between the first end 330 and the opposing second end 332. In one aspect, the rub strip protrusion 310 extends substantially perpendicular from the first planar surface 304 of the spar 302 and terminates at a third end 334. The rub strip protrusion 310 includes a third surface 312 facing the first end 330 of the spar 302. The third end 334 of the rub strip protrusion 310 is opposite the first planar surface 304 of the spar 302. The rub strip protrusion 310 includes a second retention lip 314 arranged along the third end 334 of the rub strip protrusion 310 such that the second retention lip 314 and the third surface 312 of the rub strip protrusion 310 form an acute angle β. In one aspect, the angle β is between 30° and 85°. In another aspect, the angle β is between 40° and 50°. In another aspect, the angle β is 45°. As depicted in FIG. 3A, the rub strip protrusion 310 could protrude from the first planar surface 304 of the spar 302 at a location approximately equidistant from the first end 330 and the opposing second end 332. In other aspects, the rub strip protrusion 310 could protrude from the first planar surface 304 of the spar 302 and to a location closer to the first end 330 or closer to the second end 332. In one aspect, the rub strip protrusion 310 protrudes from the first planar surface 304 of the spar 302 at a location where a distance from the rub strip protrusion 310 to the first end 330 of the spar 302 is the same as a dimension of the rub strip protrusion from the first planar surface 304 of the spar 302 to the third end 334. For example, in aspects in which the angles α and β are 45°, having the dimension of the rub strip protrusion 310 and the distance along the spar 302 from the rub strip protrusion 310 to the first end 330 being equal to each other results in the first retention lip 308 and the second retention lip 314 being aligned with one another. The first retention lip 308 and the second retention lip 314 define a window 390 therebetween (regardless of the alignment between the retention lips 308 and 314). The window 390 can receive retention tabs of a rub strip therethrough such that outward-facing notches on ends of the retention tabs can engage the retention lips 308 and 314. Such retention tabs and outward-facing notches are described in greater detail below with reference to FIGS. 4A and 5A.

The extrusion 210 also includes panel protrusions in some aspects that receive and hold panels that form a monument. In the illustrated aspect, the extrusion 210 includes a first panel protrusion 318 extending from the second planar surface 306 of the spar 302 along the first end 330 of the spar 302. The first panel protrusion 318 terminates at a sixth end 342. The extrusion 210 includes a second panel protrusion 320 extending from the second planar surface 306 of the spar 302 along the second opposing end 332 of the spar 302. The extrusion 210 includes a third panel protrusion 322 extending from the second planar surface 306 of the spar 302 at a location between the first end 330 and the second opposing end 332 of the spar 302. In one aspect, the first panel protrusion 318, the second panel protrusion 320, and the third panel protrusion 322 extend substantially perpendicularly from the second planar surface 306 of the spar 302. Referring again to FIG. 2, the exterior wall panel 230 can be arranged between the first panel protrusion 318 and the third panel protrusion 322 and the interior wall panel 232 can be arranged between the second panel protrusion 320 and the third panel protrusion 322. In aspects in which the interior wall panel 232 and the exterior wall panel 230 are a single panel, the third panel protrusion 322 of the extrusion 210 can be omitted.

The second panel protrusion 320 of the extrusion 210 includes a fourth surface 324 facing away from the first panel protrusion 318 and the third panel protrusion 322. The extrusion 210 includes a raceway protrusion 326 extending from the fourth surface 324. In one aspect, the raceway protrusion 326 extends perpendicularly from the fourth surface 324 of the second panel protrusion 320. The raceway protrusion 326 terminates at a fourth end 336 opposite the fourth surface 324. The raceway protrusion 326 includes the retention hook 328 that engages the flange 248 of the visible cover 242 of the wire raceway 240, discussed above with reference to FIG. 2. In various aspects, the wire raceway 240 could be replaced with another part, and the other part could include a flange similar to the flange 248 to engage the retention hook 328.

The extrusion 210 also includes a hinge protrusion 316 extending from the first planar surface 304 of the spar 302 along the second end 332 of the spar 302. In one aspect, the hinge protrusion 316 extends perpendicularly from the first planar surface 304 of the spar 302. The hinge protrusion 316 includes a fifth surface 350 facing away from the spar 302 and the rub strip protrusion 310. Referring again to FIG. 2, a hinge (e.g., the hinge 202) can be attached to the fifth surface 350 of the hinge protrusion 316 such that a door (e.g., the door 104) can be mounted for the monument 100. As discussed above, after the extrusion 210 is formed, fastener holes can be drilled through the fifth surface 350, and fasteners could be inserted through the hinge and the holes in the hinge protrusion 316 to attach the hinge to the hinge protrusion 316. In at least one aspect, the extrusion 210 could be located at a corner that does not have a door. In such instances, the hinge protrusion 350 could support another wall panel, such as the exterior wall panel 230 and/or the interior wall panel 232 shown in FIG. 2. Furthermore, in such instances, the hinge protrusion 316 could include additional protrusions extending away from the fifth surface 350 to support such wall panels. In at least one aspect, the hinge protrusion 316 terminates at a fifth end 338 opposite the spar 302. The extrusion 210 can include a bridge protrusion 340 extending between the third end 334 of the rub strip protrusion 310 and a fifth end 338 of the hinge protrusion 316. The bridge protrusion 340 can provide additional strength to the rub strip protrusion 310 and/or the hinge protrusion 316.

In one aspect, the extrusion 210 is formed from a metal, such as an aluminum alloy, a steel alloy, a magnesium alloy, and/or a titanium alloy. In other aspects, the extrusion 210 is formed from an engineering plastic material, such as a polyvinyl chloride (PVC) material, a polystyrene material, a polypropylene material, and/or a polyethylene material.

FIG. 4A is an end view of the vertical rub strip 220 depicted in FIG. 2. The vertical rub strip 220 typically is formed from a rubber or a resilient plastic material, such as a nylon polymer. The vertical rub strip 220 could be formed through an extrusion process. The vertical rub strip 220 includes an elongate body 402 with an exterior side 404 and an interior side 406. The elongate body 402 includes a center portion 408 that bends toward the interior side 406. For example, the exterior side 404 could define an arcuate surface. The elongate body 402 includes a first straight portion 410 extending from one side of the center portion 408 and a second straight portion 412 extending from an opposite side of the center portion 408. The first straight portion 410 includes a first end 422 with a first lip 420 protruding from the interior side 406 of the elongate body 402 at the first end 422. The second straight portion 412 includes a second end 426 with a second lip 424 protruding from the interior side 406 of the elongate body 402 at the second end 426. In one aspect, the lips 422 and 424 fully cover and hide from view the extrusion 210 to reduce visible parting lines and exposed seams.

The vertical rub strip 220 also includes a first retention tab 413 extending from the interior side 406 of the elongate body 402 and a second retention tab 416 extending from the interior side 406 of the elongate body 402. The first retention tab 413 and the second retention tab 416 extend from the center portion 408 of the elongate body 402. The first retention tab 413 includes a first outward-facing notch 414 and the second retention tab 416 includes a second outward-facing notch 418. Because the vertical rub strip 220 is made from a resilient material, the first retention tab 413 and the second retention tab 416 are deformable in the direction of arrows A. Put differently, the first retention tab 413 and the second retention tab 416 can be squeezed together. When such a squeezing force is removed, the first retention tab 413 and the second retention tab 416 move in the direction indicated by arrows B to return to a relaxed state.

The vertical rub strip 220 also includes a first alignment protrusion 430 extending from the interior side 406 of the elongate body 402 and a second alignment protrusion 432 extending from the interior side 406 of the elongate body 402. The first alignment protrusion 430 and the second alignment protrusion 432 extend from the center portion 408 of the elongate body 402 and/or a transition between the center portion 408 and the respective straight portions 410 and 412 of the elongate body 402.

Figure 5A:
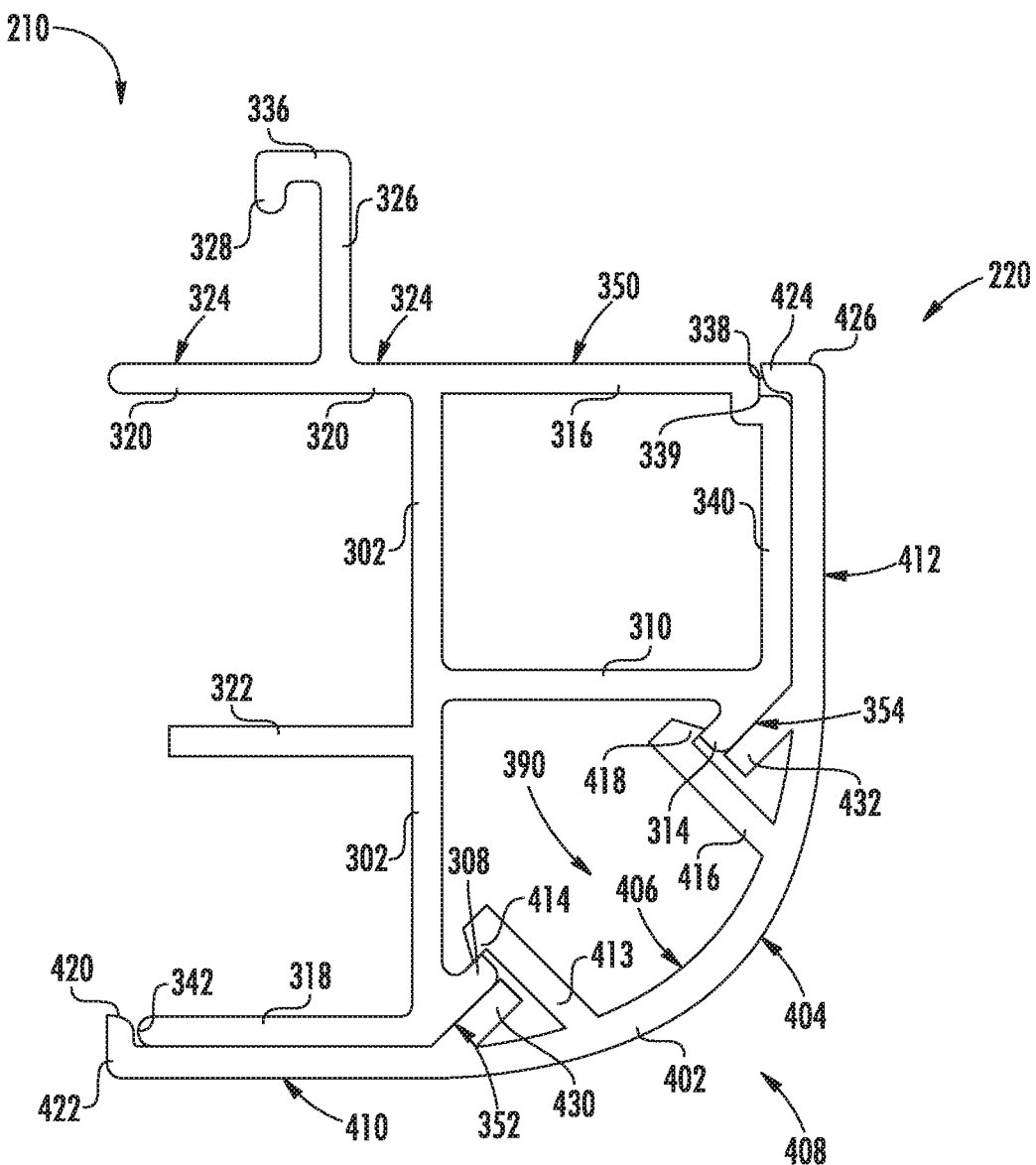
FIG. 5A is an end view of the extrusion and vertical rub strip illustrated in FIG. 2 assembled together.

FIG. 5A illustrates the vertical rub strip 220 of FIG. 4A installed in the extrusion 210 of FIG. 3A. The outward-facing notch 414 of the first retention tab 413 of the vertical rub strip 220 is engaged with the first retention lip 308 of the extrusion 210. Also, the outward-facing notch 418 of the second retention tab 416 of the vertical rub strip 220 is engaged with the second retention lip 314 of the extrusion 210. The retention tabs 413 and 416 deflect inwardly (in the direction of arrows A in FIG. 4A) such that the outward-facing notches 414 and 418 can move through the window 390 and past the first and second retention lips 308 and 314. Once the notches 414 and 418 pass the first and second retention lip 308 and 314, the retention tabs 413 and 416 can relax outwardly (in the direction of arrows B in FIG. 4A) such that the outward-facing notches 414 and 418 engage the respective retention lips 308 and 314.

The first alignment protrusion 430 of the vertical rub strip 220 can abut an outward-facing surface 352 of the first alignment protrusion 308. Similarly, the second alignment protrusion 432 of the vertical rub strip 220 abuts an outward-facing surface 354 of the second alignment protrusion 314. The first and second alignment protrusions 430 and 432 pressing against the respective retention lips 308 and 314 can provide tension between the notches 414 and 418 and the first and second retention lips 308 and 314, respectively. Stated differently, the first and second alignment protrusions 430 and 432 may be deformed from a relaxed state when the notches 414 and 418 and the first and second retention lips 308 and 314 are engaged. The deformation of the first and second alignment protrusions 430 and 432 introduces a biasing force that pulls the notches 414 and 418 into engagement with the first and second retention lips 308 and 314. The biasing force increases frictional forces between the notches 414 and 418 and the retention lips 308 and 314 that could prevent inadvertent disengagement. The first and second alignment protrusions 430 and 432 can also urge the vertical rub strip 220 into alignment with the extrusion 210. In one aspect, the first and second alignment protrusions 430 and 432 are relatively short and stiff to positively locate and keep the vertical rub strip 220 centered in alignment with the extrusion 210, which allows the 413 and 416 retention tabs to be relatively long and flexible to create an optimal snap-in engagement feature.

In at least one aspect, the extrusion 210 also includes a small notch 339 or joggle local to the fifth end 338 and an slightly shortened first panel protrusion 318 such that the first lip 420 and second lip 424 can wrap around these edges and fully hide the extrusion 210 from view.

The vertical rub strip 220 can also be attached to the extrusion 210 along the first end 422 and the second end 426. As illustrated in FIG. 5A, the first lip 420 along the first end 422 of the elongate body 402 can engage the sixth end 342 of the first panel protrusion 318. Similarly, the second lip 424 along the second end 426 of the elongate body 402 can engage the fifth end 338 of the hinge protrusion 316. In at least one aspect, the extrusion 210 and the vertical rub strip 220 are sized such that the first straight portion 410 and the second straight portion 412 stretch slightly for the first lip 422 engage the sixth end 342 of the first panel protrusion 318 and for the second lip 424 two engage the fifth end 338 of the hinge protrusion 316. Such slight stretching can increase friction forces between the lips 420 and 424 of the vertical rub strip 220 and the respective ends 342 and 338 of the extrusion 210, thereby increasing engagement therebetween.

Referring again to FIG. 2, the vertical rub strip 220 wraps neatly around the extrusion 210 and does not require any trimming after installation. For example, the vertical rub strip 220 does not require trimming proximate to the hinge 202 for the door panel 104. In at least one aspect, as shown in FIG. 2, the hinge 202 can at least partially cover the second end 426 of the vertical rub strip 220. Additionally on the non-hinge side for door openings the second end 426 of the vertical rub strip 220 wraps around the edge of the extrusion 210 at the fifth end 338 and terminates flush with the fifth surface 350 on the hinge protrusion such that the rub strip 220 does not require trimming to be kept clear of the door opening.

Figure 5B:
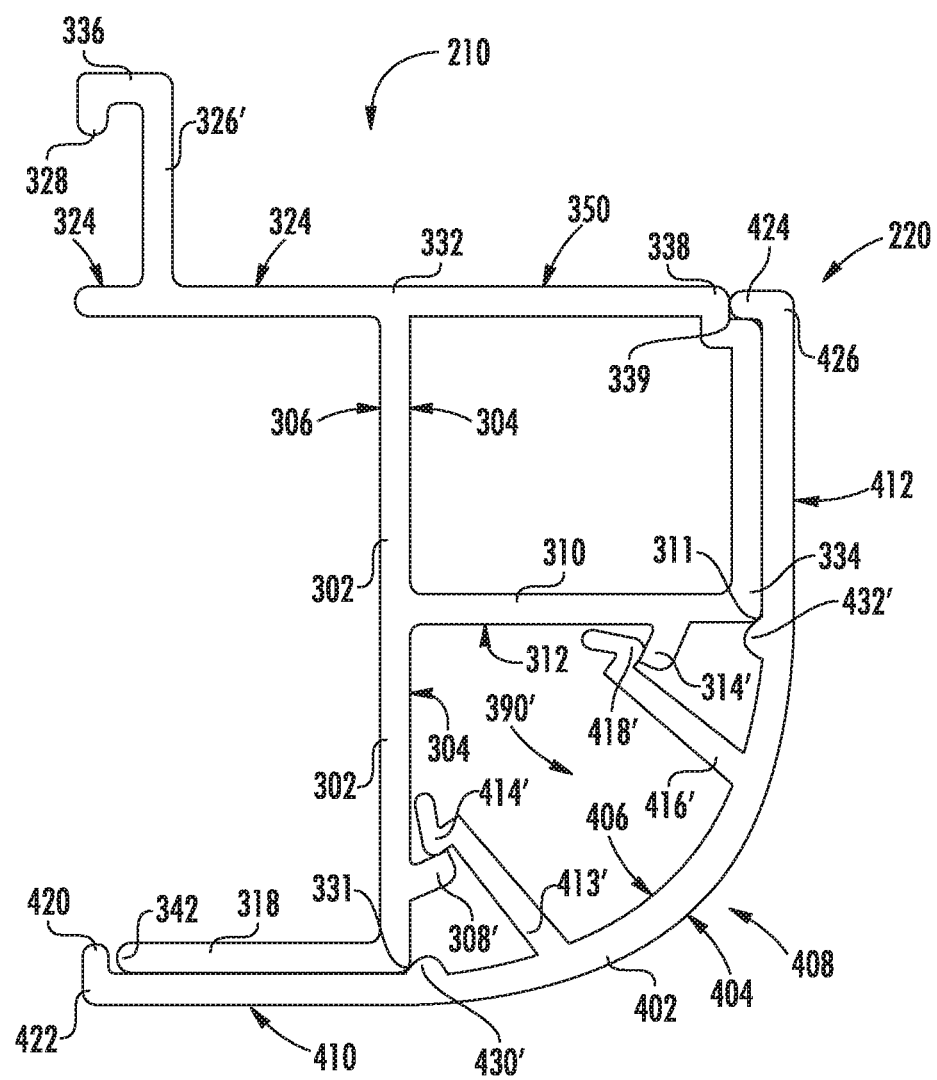
FIG. 5B is an end view of the variations of the extrusion and vertical rub strip from FIGS. 3B and 4B, respectively, assembled together.

FIGS. 3B, 4B, and 5B are top views of an extrusion 210' and rub strip 220' that are variations of the extrusion 210 and rub strip 220 illustrated in FIGS. 2, 3A, 4A, and 5A. The extrusion 210' illustrated in FIG. 3B includes a first retention lip 308' that extends from the first planar surface 304 of the spar 302 at a location that is spaced apart from the first end 330. Additionally, the extrusion 210' includes a second retention lip 314' that extends from the third surface 312 of the rub strip protrusion 310 at a location that is spaced apart from the third end 334. As a result of the first retention lip 308' being spaced apart from the first end 330, the first end 330 includes a first corner 331. Likewise, as a result of the second retention lip 314' being spaced apart from the third end 334, the third end 334 includes a second corner 311. The vertical rub strip 220' illustrated in FIG. 4B includes a first retention tab 413' that extends from the interior surface 406 of the elongate body 402 and includes a first outward-facing notch 414' formed as an angled kink at an end of the first retention tab 413'. The vertical rub strip 220' also includes a second retention tab 416' that extends from the interior surface 406 of the elongate body 402 and includes a second outward-facing notch 418' formed as an angled kink at an end of the first retention tab 416'. Furthermore, the vertical rub strip 220' includes a first alignment nub 430' in place of the first alignment protrusion 430 illustrated in FIG. 4A. Also, the vertical rub strip 220' includes a second alignment nub 432' in place of the second alignment protrusion 432 illustrated in FIG. 4A.

FIG. 5B illustrates the vertical rub strip 220' of FIG. 4B installed in the extrusion 210' of FIG. 3B. The outward-facing notch 414' of the first retention tab 413' of the vertical rub strip 220' is engaged with the first retention lip 308' of the extrusion 210'. Also, the outward-facing notch 418' of the second retention tab 416' of the vertical rub strip 220' is engaged with the second retention lip 314' of the extrusion 210'. The retention tabs 413' and 416' deflect inwardly (in the direction of arrows A in FIG. 4B) such that the outward-facing notches 414' and 418' can move through the window 390' and past the first and second retention lips 308 and 314. Once the notches 414' and 418' pass the first and second retention lip 308' and 314', the retention tabs 413' and 416' can relax outwardly (in the direction of arrows B in FIG. 4B) such that the outward-facing notches 414' and 418' engage the respective retention lips 308' and 314'.

When the vertical rub strip 220' is installed on the extrusion 210', the first alignment nub 430' on the vertical rub strip 220' abuts the first corner 331 at the first end 330 of the spar 203. Also, the second alignment nub 432' on the vertical rub strip 220' abuts the second corner 311 at the third end 334 of the rub strip protrusion 310. The first and second alignment nubs 430' and 432' can urge the vertical rub strip 220' into alignment with the extrusion 210'.

Figure 6A:
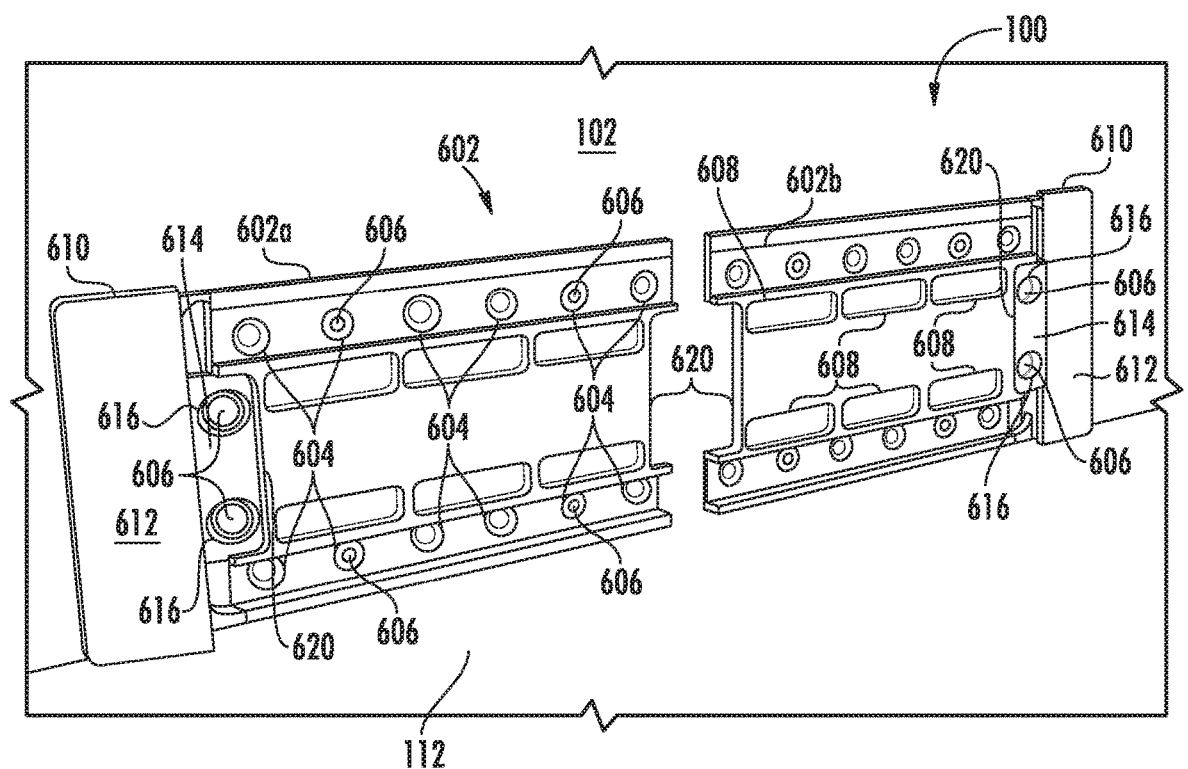
FIG. 6A is a perspective view of a retaining rail according to one aspect affixed to a wall surface with end caps arranged at ends of the retaining rail.
Figure 6B:
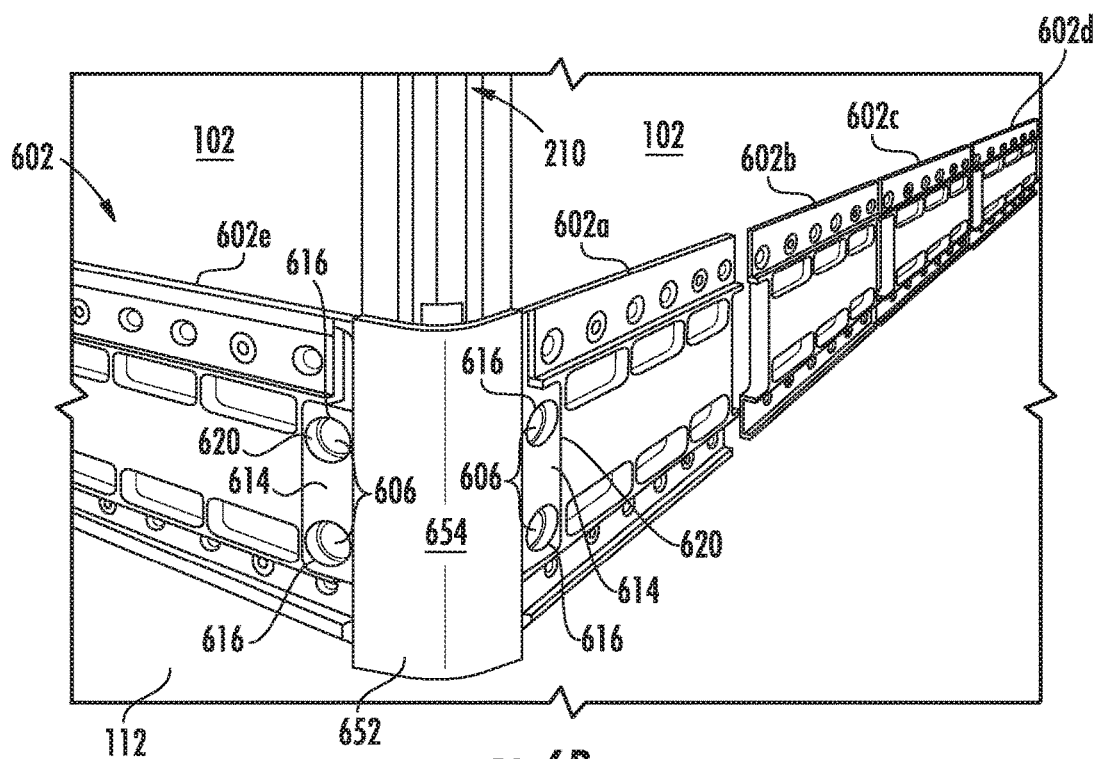
FIG. 6B is a perspective view of retaining rails according to the aspect illustrated in FIG. 6A on two walls, wherein the walls meet at a corner, and a corner end cap arranged at ends of the retaining rails proximal to the corner.

Referring again to FIG. 1, the monument 100 can also include horizontal rub strips 110 arranged at a base of the monument 100 and horizontal rub strips 108 positioned along the wall 102 and door 104 at a position spaced apart from the floor 112. FIGS. 6A and 6B are perspective views of retaining rails and end caps that can be used with such horizontal rub strips. As shown in FIGS. 6A and 6B, the retaining rails and end caps are positioned at the base of the monument 100 adjacent to the floor 112. However, the retaining rails and caps could also be positioned at a different location of the monument spaced apart from the floor 112. FIG. 6A illustrates a retaining rail 602 that includes a first retaining rail segment 602a and a second retaining rail segment 602b. In various aspects, the retaining rail 602 could be made of a single retaining rail segment or more than two retaining rail segments. The use of retaining rail segments, such as retaining rail segments 602a and 602b, provide for a modular design such that a suitable number of retaining rail segments can be aligned in a row and spaced apart to provide a retaining rail of nearly any length. Thus, the retaining rail 602 does not have to be custom sized for every different application.

The retaining rail segments 602a and 602b include pluralities of fastener holes 604. Fasteners 606 are inserted through selected ones of the pluralities of fastener holes 604 to affix the first and second retaining rail segments 602a and 602b to the wall surface 102 (or to a door panel 104). As shown in FIG. 6A, each of the retaining rail segments 602a and 602b is attached to the wall by four fasteners 606. In various aspects, more or fewer numbers of fasteners can attach the retaining rail segments 602a and 602b to the wall 102. The retaining rail segments 602a and 602b include alignment notches 620 arranged at ends of the retaining rail segments 602a and 602b. FIG. 6A also illustrates end caps 610 arranged at ends of the row of retaining rail segments 602a and 602b. The end caps 610 include alignment tabs 614 that engage the alignment notches 620 of the retaining rail segments 602a and 602b. The alignment tabs 614 can also include fastener holes 616 the receive fasteners 606 to affix the end caps 610 to the wall 102. The end caps 610 include an outward-facing surface 612 with an exterior profile that matches the profile of a rub strip (discussed in greater detail below with reference to FIGS. 7A and 7B) installed over the retaining rail 602 so that the outward-facing surfaces 612 of the end caps 610 and the rub strip form a nearly continuous surface.

FIG. 6B illustrates an end cap 652 that covers a corner between intersecting walls 102. The endcap 652 includes an exterior profile 654 that bends around the corner and it also matches the profile of the rub strips installed over the retaining rails 602 on the walls 102. The endcap 652 includes alignment tabs 614 that engage alignment notches 620 of retaining rail segments adjacent to the corner. For example, as shown in FIG. 6B, a first alignment tab 614 of the endcap 652 engages an alignment notch 620 of a retaining rail segment 602e on a first wall and a second alignment tab 614 of the endcap 652 engages an alignment notch 620 of a retaining rail segment 602a and a second wall 102. As shown in FIG. 6B, the endcap 652 can be arranged over the extrusion 210 in at least one aspect. In such aspects, the endcap 652 can include interior features similar to or identical to the first retaining tab 413 the second retaining tab 416 and the respective outward-facing notches 414 and 418 of the vertical rub strip 220, discussed above with reference to FIGS. 4 and 5, to further secure the endcap 652 in the corner.

Figure 7A:
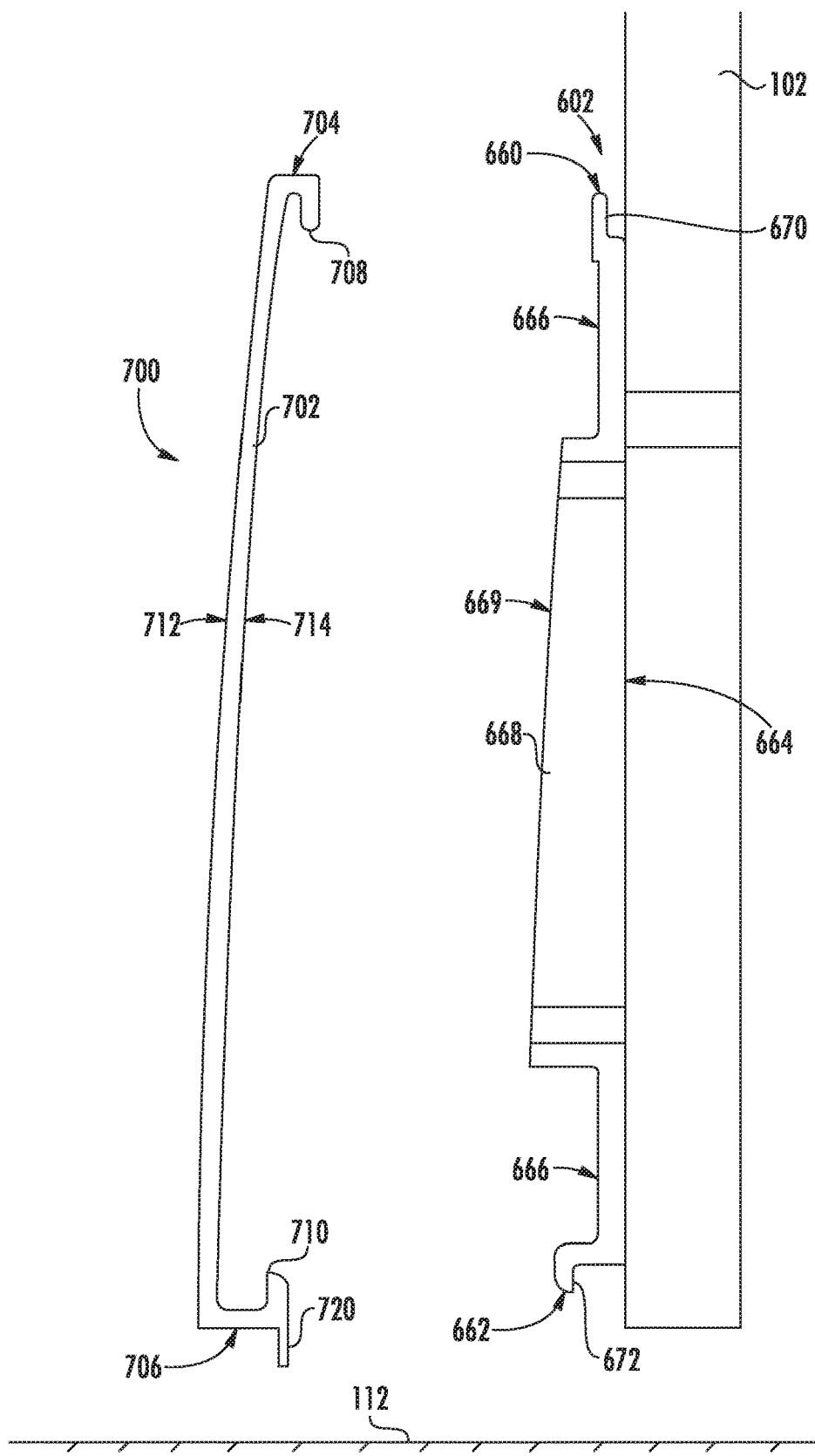
FIG. 7A is an end cross-sectional view of a retaining rail according to the aspect illustrated in FIG. 6A affixed to a wall surface with a rub strip illustrated in exploded view.
Figure 7B:
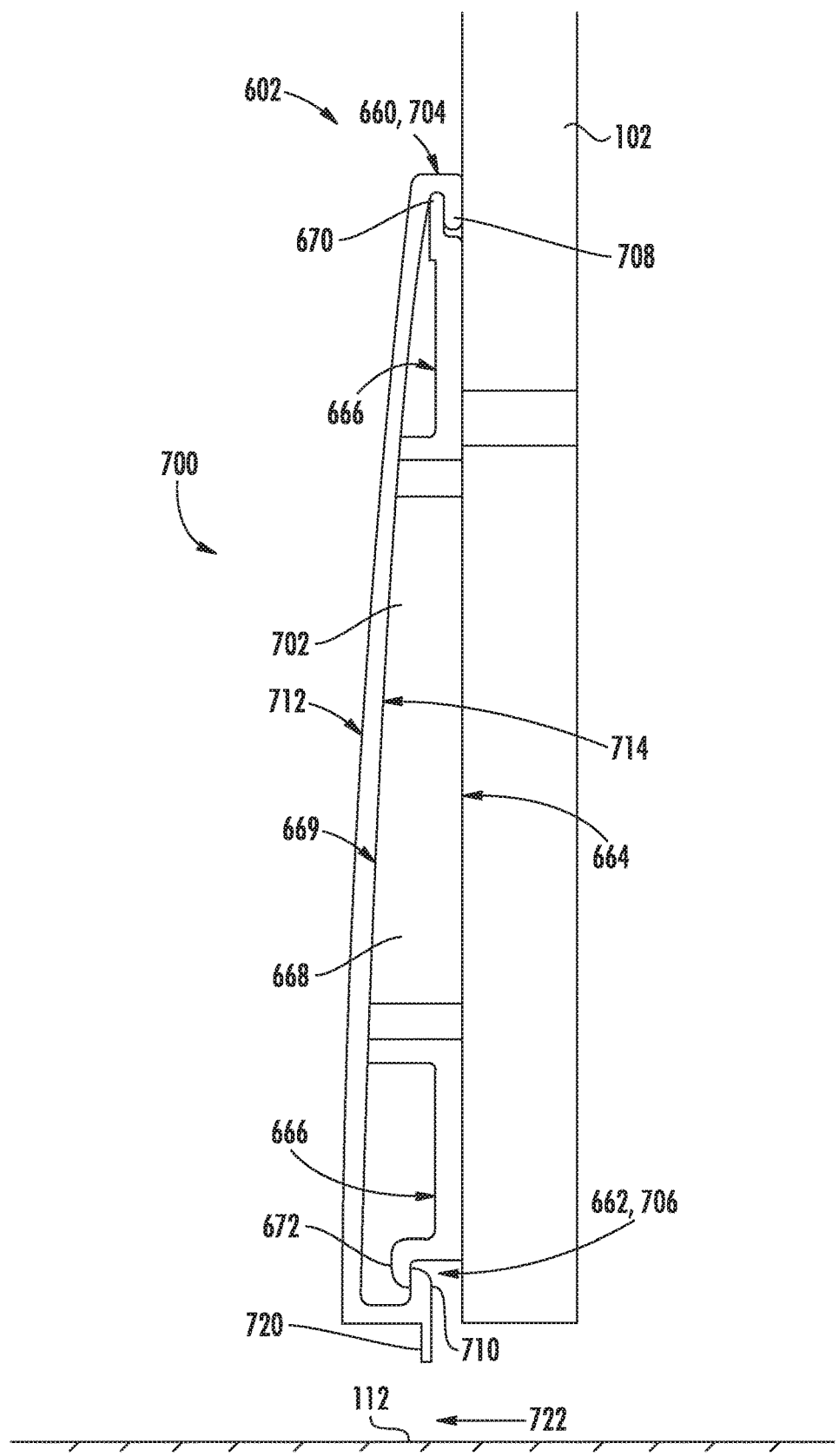
FIG. 7B is an end cross-sectional view of a retaining rail of FIG. 7A with the rub strip of FIG. 7A installed on the retaining rail.

FIGS. 7A and 7B are side views of the retaining rail 602 from the side and also illustrate a rub strip 700 in an unattached state and an attached state with respect to the retaining rail 602, respectively. The retaining rail 602 includes a flat side 664 abutting the surface of the wall 102 and an opposing side 666. The retaining rail 602 further includes a first lengthwise end 662 and a second lengthwise end 660 opposite the first lengthwise end 662. The first lengthwise end 662 includes a first outward-facing retention lip 672 and the second lengthwise end 660 includes a second outward-facing retention lip 670.

The rub strip 700 includes a resilient, elongate body 702 that includes a third lengthwise end 706 and a fourth lengthwise end 704 opposite the third lengthwise end 706. The elongate body includes an exterior surface 712 and an interior surface 714 between the third lengthwise end 706 and the fourth lengthwise end 704. The third lengthwise end 706 of the elongate body includes a first inward-facing retention tab 710 that engages the first outward-facing retention lip 672 of the retaining rail 602. Similarly, the fourth lengthwise end 704 of the elongate body 702 includes a second inward-facing retention tab 708 that engages the second outward-facing retention lip 670 of the retaining rail 602. The resilient body 702 can be deformed from a relaxed state to spread apart the first inward-facing retention tab 710 and the second inward-facing retention tab 708 such that the inward-facing retention tabs 710 and 708 can be placed over the respective outward-facing retention lips 672 and 670 of the retaining rail. After the elongate body 702 is placed over the retaining rail 602, the elongate body 702 can be released such that it returns to the relaxed state. As a result, the first inward-facing retention tab 710 engages the first outward-facing retention lip 672 and the second inward-facing retention tab 708 engages the second outward-facing retention lip 670, and the rub strip 700 is attached to the retaining rail 602. Alternatively, the second inward-facing retention tab 708 of the rub strip 700 in the relaxed state can be placed over (hooked onto) the second outward-facing retention lip 670 of the retention rail 602, and then subsequently the third lengthwise end 706 of the rub strip 700 can be deformed to allow the first inward-facing retention tab 710 to flex over the first outward-facing retention tab 672 to reach the engaged position between the rub strip 700 and retention rail 602 shown in FIG. 7B. The retaining rail 602, rub strip 700, and endcaps 610 and/or 652 are collectively referred to as a wall guard herein.

In at least one aspect, the retaining rail 602 can include at least one protrusion 668 extending from the outward-facing side 666 of the retaining rail 602. As illustrated in FIG. 7B, an exterior surface 669 of the at least one protrusion 668 can press against the interior surface 714 of the elongate body 702. The pressing engagement between the exterior surface 669 of the at least one protrusion 668 and the interior surface 714 of the elongate body 702 creates tension between the retention tabs and can increase frictional forces between the inward-facing retention tabs 710 and 708 of the elongate body 702 and the outward-facing retention lips 672 and 670, respectively, of the retaining rail 602, thereby increasing engagement and retention therebetween. The protrusion 668 can also limit any deformation of the rub strip 700 in the event that the exterior surface 712 of the rub strip 700 is impacted by a person or object, for example. The protrusion 668 can also ensure the profile of the rub strip 700 (which may be somewhat flexible) is nominally held in a position that matches the profile of the adjacent end cap 610 or 652 to maintain a nearly continuous surface.

In various aspects, the rub strip 700 can include an outward-facing protrusion 720 extending from the third lengthwise end 706 of the elongate body 702. The outward-facing protrusion 720 forms a reduced gap 722 with the floor 112 when the rub strip 700 is installed on the retaining rails 602. In various circumstances, the reduced gap 722 is suitably small such that a sealant bead of caulk (or other sealant) could be formed between the floor 112 and the outward-facing protrusion 720. Such sealing capability may be advantageous in environments that are potentially exposed to water, such as galleys and lavatories. The outward-facing protrusion 720 can be recessed from the exterior surface 712 as shown in FIG. 7B to mostly hide from view the caulk or other sealant.

Figure 8A:
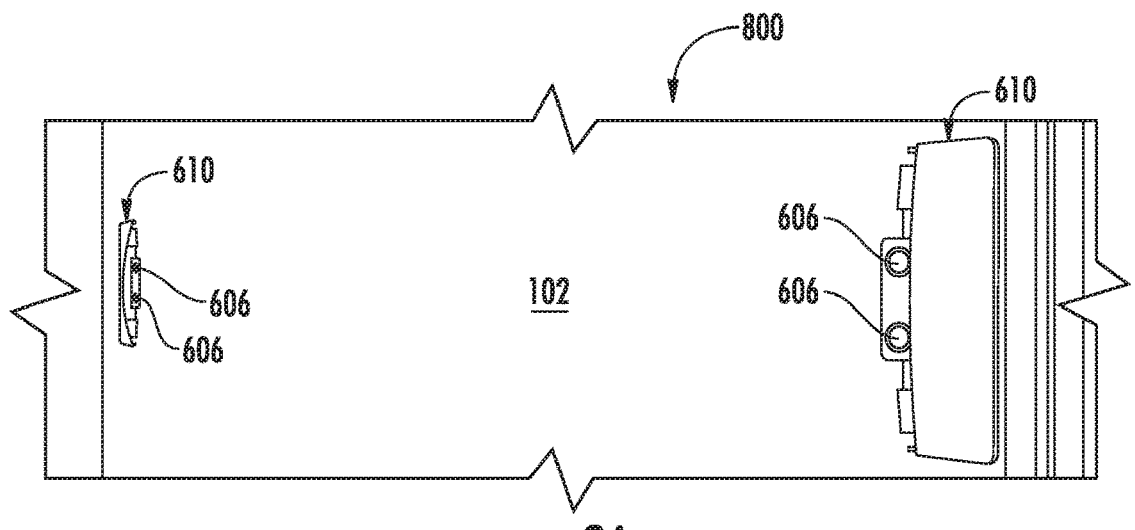
FIG. 8A is a perspective view of a monument surface after a first step in a process, according to one aspect, in which end caps according to one aspect are affixed to a wall surface.
Figure 8B:
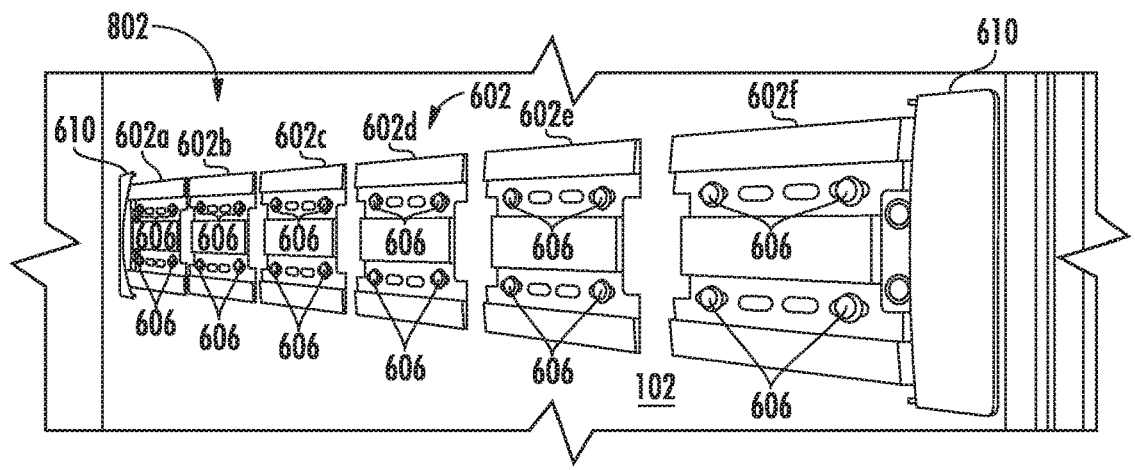
FIG. 8B is a perspective view of the monument wall after a second step of the process illustrated in FIG. 8A, in which a retaining rail according to the aspect is affixed to the wall surface between and in line with the end caps.
Figure 8C:
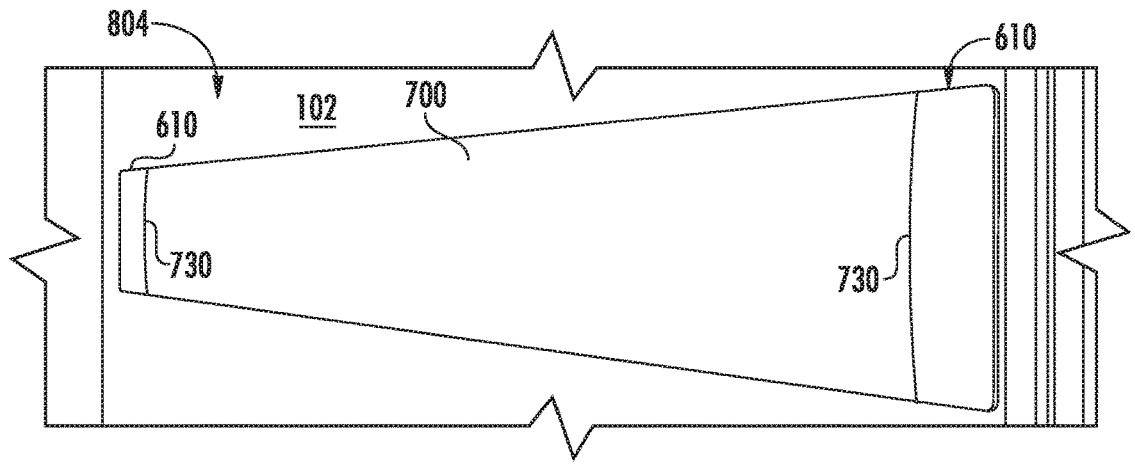
FIG. 8C is a perspective view of the monument wall after a third step of the process illustrated in FIGS. 8A and 8B, in which a rub strip according to the aspect is arranged over the retaining rail and a portion of the end caps.

FIGS. 8A-8C are perspective views that illustrate a process by which a wall guard according to one aspect can be installed on a wall surface. FIGS. 8A-8C illustrate a wall guard spaced apart from the floor surface, but the process shown herein is equally applicable to a wall guard placed at floor level. As shown in a first process step 800 in FIG. 8A, end caps 610 can be arranged at ends of a wall guard arrangement on a wall surface 102. The end caps are secured to the wall surface 102 via fasteners 606. As shown in FIG. 8B, a retaining rail 602 can be arranged between the end caps 610. FIG. 8B illustrates a second process step 802 in which a total of six retaining rail segments 602a, 602b, 602c, 602d, 602e, and 602f are arranged between and aligned with the end caps. As discussed above, the number of retaining rail segments used in the spacing between adjacent retaining rail segments can be adjusted based on the length of the wall guard to be installed on the wall surface 102. FIG. 8C illustrates a third process step 804 in which the rub strip 700 is placed over the retaining rail 602. The rub strip 700 fits between the end caps 610 such that the end caps 610 cover ends of the rub strip 700. Stated differently, the end caps 610 block a view of the retaining rail 602 behind the rub strip 700 that would be visible through ends of the rub strip 700. The resulting wall guard includes two exposed seams 730 where the rub strip 700 meets the end caps 610. The seams 730 are relatively small and therefore provide a small target for dust, dirt, or other debris to accumulate. As discussed above, an exterior surface of the end caps 610 includes a profile that matches an exterior profile of the rub strip 700 to provide, among other things, a continuous surface appearance.

Figure 9A:
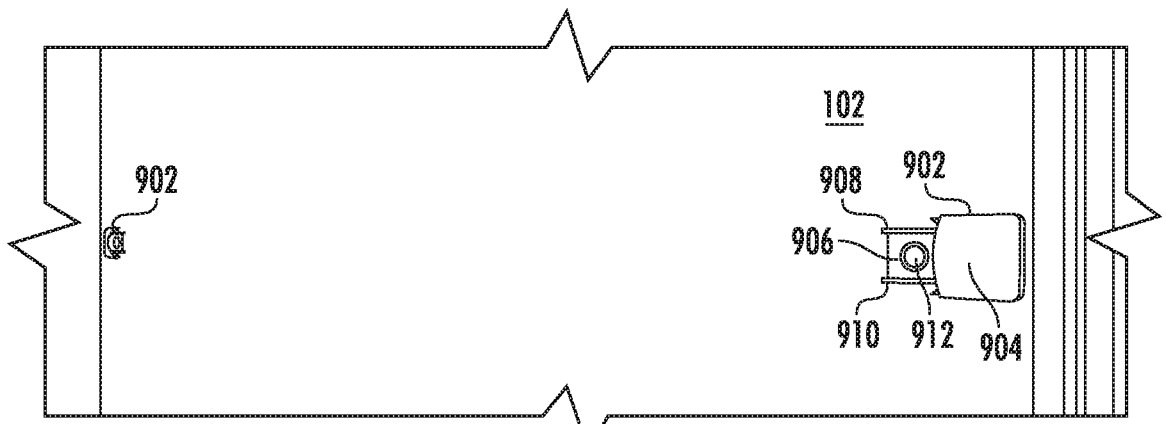
FIG. 9A is a perspective view of a monument wall after a first step in a process, according to another aspect, in which end caps according to another aspect are affixed to a wall surface.
Figure 9B:
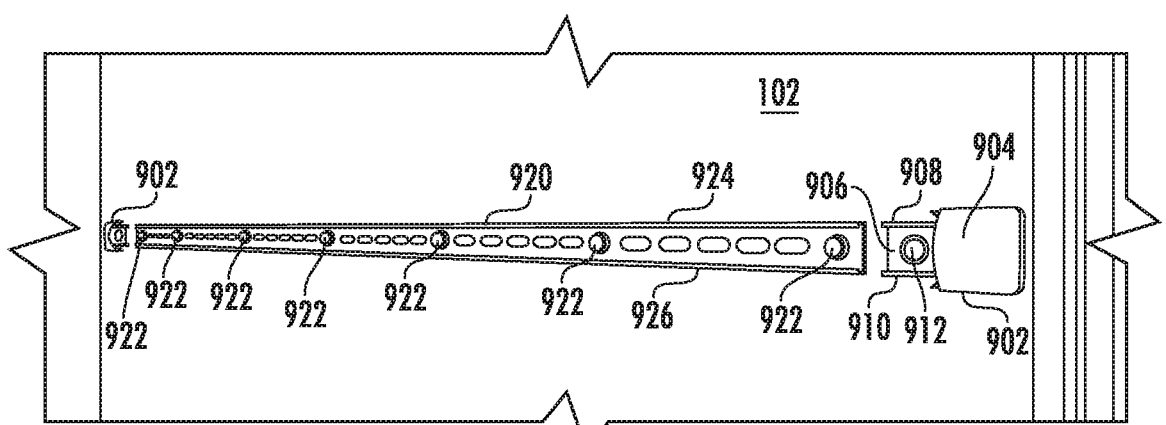
FIG. 9B is a perspective view of the monument wall after a second step of the process illustrated in FIG. 9A, in which a retaining rail according to the another aspect is affixed to the wall surface between and in line with the end caps.
Figure 9C:
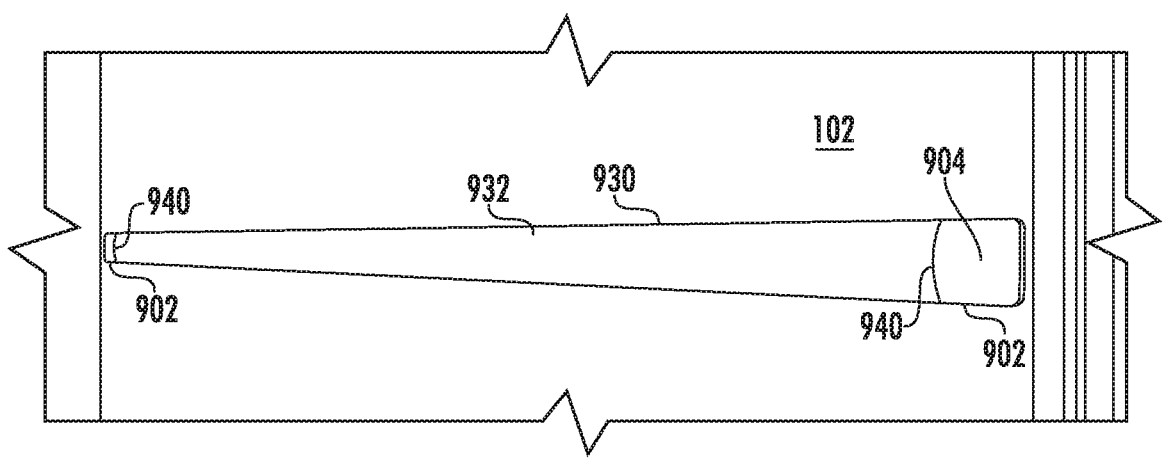
FIG. 9C is a perspective view of the monument wall after a third step of the process illustrated in FIGS. 9A and 9B, in which a rub strip according to the another aspect is arranged over the retaining rail and a portion of the end caps.

FIGS. 9A-9C are perspective views that illustrate a process by which a wall guard according to another aspect can be installed on a wall surface. FIGS. 9A-9C illustrate a wall guard spaced apart from the floor surface, but the process shown herein is equally applicable to a wall guard placed at floor level. The wall guard illustrated in FIGS. 9A-9C is not as wide as the wall guard illustrated in FIGS. 8A-8C. As shown in FIG. 9A, end caps 902 can be arranged at ends of a wall guard arrangement on a wall surface 102. The end caps are secured to the wall surface 102 via fasteners 912 (which could be the same or different as the fasteners 606 discussed above with reference to FIGS. 8A-8C). As shown in FIG. 9B, a retaining rail 920 can be arranged between the end caps 902. In the aspect shown in FIGS. 9A-9B, the retaining rail 920 comprises a single, continuous retaining rail. However, the retaining rail 920 could include a plurality of retaining rail segments. The retaining rail 920 includes a first lengthwise end 924 and a second lengthwise end 926 opposite the first lengthwise end 924. The retaining rail 920 is attached to the wall surface 102 with fasteners 922 (which could be the same or different as the fastener 606 and/or 912). In this aspect, the end caps 902 include retaining rail extensions 906. The retaining rail extensions 906 include a fifth lengthwise end 908 aligned with the first lengthwise end 924 of the retaining rail 920. The retaining rail extensions 906 also include a sixth lengthwise end 910 aligned with the second lengthwise end 926 of the retaining rail 920. FIG. 8C illustrates a rub strip 930 placed over the retaining rail 920. The rub strip 930 includes an exterior surface 932 with a profile that is matched by an exterior surface 904 of the end caps 902. The rub strip 930 fits between the end caps 904 such that the end caps 904 cover ends of the rub strip 930. Stated differently, the end caps 902 block a view of the retaining rail 920 behind the rub strip 930 that would be visible through ends of the rub strip 930. The resulting wall guard includes two small seams 940 where the rub strip 930 meets the end caps 902. As discussed above, the exterior surface of the end caps 904 includes a profile that matches an exterior profile of the rub strip 930 to provide, among other things, a continuous surface appearance.

Figure 9D:
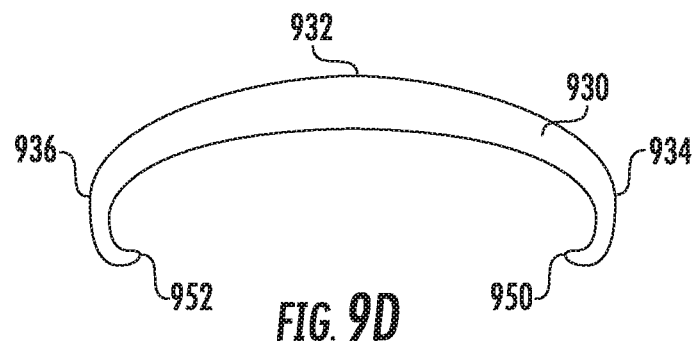
FIG. 9D is an end view of the rub strip of FIG. 9C in a relaxed state.
Figure 9E:
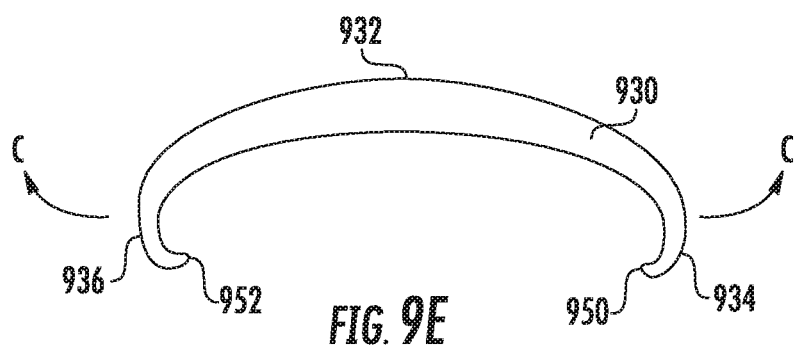
FIG. 9E is an end view of the rub strip of FIG. 9D deformed from the relaxed state shown in FIG. 9D.
Figure 9F:
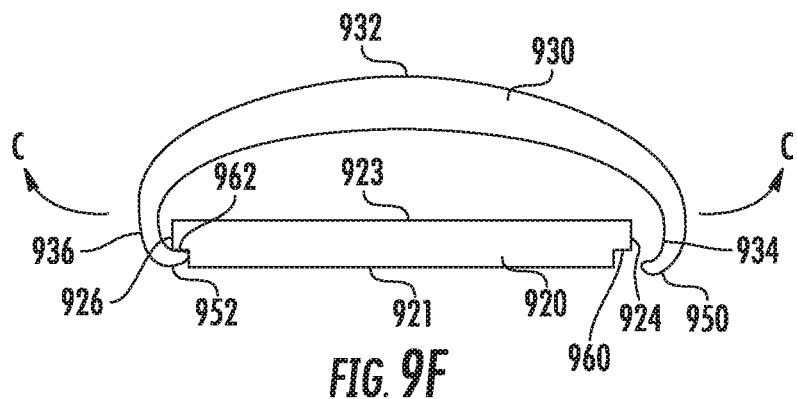
FIG. 9F is an end view of the rub strip of FIG. 9E, deformed from the relaxed state and aligned with the retaining rail of FIG. 9B.

FIGS. 9D-9G are end views that illustrate steps for attaching the rub strip 930 to the retaining rail 920. FIG. 9D illustrates an end view of the rub strip 930. The rub strip 930 includes a third lengthwise end 934 and a fourth lengthwise end 936 opposite the third lengthwise end 934. The third lengthwise end 934 includes a first inward-facing retention tab 950 and the fourth lengthwise end 936 includes a second inward-facing retention tab 952. The rub strip 930 is made of a resilient material such that the rub strip 932 can be deformed from a relaxed state shown in FIG. 9D to a stretched state shown in FIG. 9E (in which the third lengthwise end 934 and the fourth lengthwise end 936 have been pulled apart from one another as indicated by arrows C). FIG. 9F illustrates the rub strip 930 positioned over and aligned with the retaining rail 920 in the stretched state. The retaining rail 920 includes a flat side 921 that can be arranged against a wall surface and an opposing side 923. As shown in FIG. 9F, the second inward-facing retention tab 952 is engaged with a second outward-facing retention lip 962 along the second lengthwise end 926 of the retaining rail 920. Also, the first inward-facing retention tab 950 is aligned with but not engaged with a first outward-facing retention lip 960 along the first lengthwise end 924 of the retaining rail 920. The arrangement shown in FIG. 9F could be achieved by an installer engaging the second inward-facing retention tab 952 of the rub strip 930 with the second outward-facing retention lip 962 and then pulling on the third lengthwise end 934 of the rub strip 930 such that the third lengthwise end 934 moves away from the fourth lengthwise end 936. Consequently, the third lengthwise end 934 and the first inward-facing retention tab 950 will be spaced apart from the first outward-facing retention lip 960 of the retaining rail 920. The inward-facing retention tabs 950 and 952 could also engage outward-facing retention lips on the fifth lengthwise ends 908 and the sixth lengthwise ends 910 on the rail extensions 906 of the end caps 902.

Figure 9G:
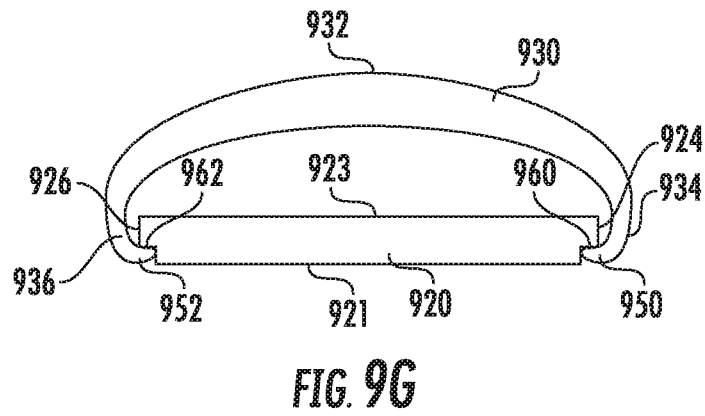
FIG. 9G is an end view of the rub strip of FIG. 9E returned to the relaxed state such that the rub strip is affixed to the retaining rail of FIG. 9B.

In FIG. 9G, after the rub strip 930 is aligned with the retaining rail, any force being applied to the rub strip 930 can be relaxed so that the rub strip 930 can return to the relaxed state shown in FIG. 9D. As a result, as shown in FIG. 9G, the first inward-facing retention tab 950 is engaged with the first outward-facing retention lip 960 and the second inward-facing retention tab 952 is engaged with the second outward-facing retention lip 962, thereby attaching the rub strip 930 to the retaining rail 920.

Figure 10:
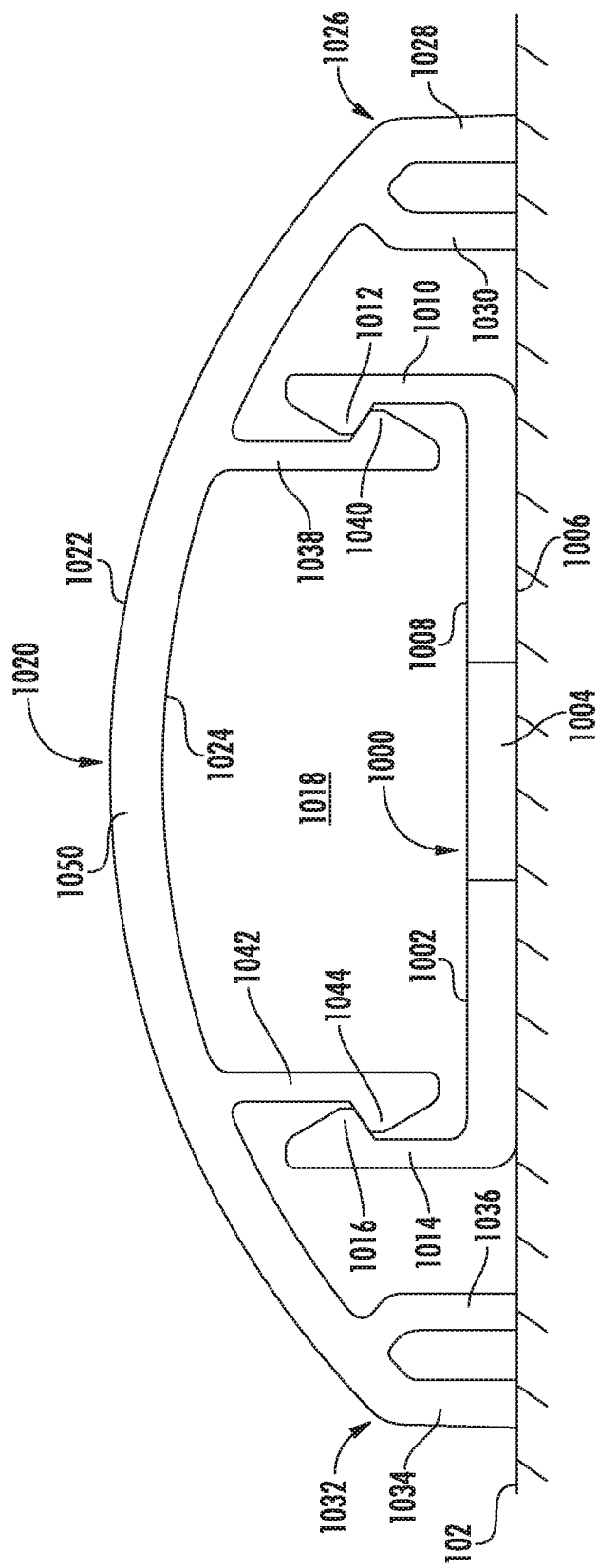
FIG. 10 is a cross-sectional end view of a rub strip affixed to a retaining rail according to another aspect.

FIG. 10 is a cross-sectional end view of another aspect of a rub strip 1020 and retaining rail 1000 attached to a wall 102 (or to another surface, such as a door 104). The retaining rail 1000 includes a body 1002 that includes a wall-facing surface 1006 that abuts the wall 102 (or other surface) and an opposing surface 1008. The body 1002 includes a plurality of fastener holes 1004 (only one is shown in the cross-sectional view) to receive fasteners that attach the retaining rail 1000 to the wall 102 (or other surface). The retaining rail 1000 includes a first protrusion 1010 and a second protrusion 1014 extending away from the opposing surface 1008 of the body 1002. In at least one aspect, the first protrusion 1010 and the second protrusion 1014 extend away from lengthwise ends of the body 1002. The first protrusion 1010 includes a first inward-facing notch 1012 and the second protrusion 1014 includes a second inward-facing notch 1016. The inward-facing notches 1012 and 1016 define a gap 1018 therebetween. As discussed in greater detail below, the inward-facing notches 1012 and 1016 engage outward-facing notches 1040 and 1044, respectively, on the rub strip 1020 to hold the rub strip 1020 in place against the wall 102 (or other surface). In one aspect, the retaining rail 1000 is made of a rigid material, such as a plastic material.

The rub strip 1020 includes a body 1050 that includes an outward-facing surface 1022 and an opposing interior surface 1024. The interior surface includes a first retention tab 1038 and a second retention tab 1042 extending from the interior surface 1024 toward the retaining rail 1000. The first retention tab 1038 includes a first outward-facing notch 1040 and the second retention tab 1042 includes a second outward-facing notch 1044. The rub strip 1020 is made of a resilient material, such as a nylon polymer or metal. When the rub strip 1020 is installed on the retaining rail 1000, the retention tabs 1038 and 1042 can flex inwardly such that the outward-facing notches 1040 and 1044 can pass through the gap 1018 between the inward-facing notches 1012 and 1016. Thereafter, the retention tabs 1038 and 1042 return to an relaxed state such that the outward-facing notches 1040 and 1044 of the rub strip 1020 are engaged with the respective inward-facing retention notches 1012 and 1016 of the retaining rail 1000. As a result, the rub strip 1020 is attached to the retaining rail 1000. This method of outward-facing retention notches on rub strip 1020 provides superior retention performance because when the rub strip 1020 is impacted (for example by luggage or a galley cart) in the center of the exterior surface 1022 it causes the retention tabs 1038 and 1042 to flex outward increasing their engagement with inward-facing notches 1012 and 1016 on the retaining rail 1000 during the impact. If the configuration were reversed with inward-facing retention notches on the rub strip 1020 the same impact could cause the rub strip 1020 to disengage from the retaining rail 1000.

The rub strip 1020 includes extensions along lengthwise ends 1026 and 1032 that contact the wall 102 (or other surface). The rub strip 1020 includes a first outer edge extension 1034 extending from a first end 1032 to the wall 102 and a second outer edge extension 1028 extending from a second end 1026 to the wall 102. In at least one aspect, the rub strip 1020 also includes a first inner edge extension 1036 extending from the interior surface 1024 at a location proximal to the first end 1032 to the wall 102 and a second inner edge extension 1030 extending from the interior surface 1024 at a location proximal to the second end 1026 to the wall 102. Providing two edge extensions at and toward the ends 1032 and 1026 of the rub strip 1020 can provide extra rigidity of the ends of the rub strip 1020 (relative to a rub strip 1020 that has single edge protrusions). Additionally, the two edge extensions at and toward the ends 1032 and 1026 of the rub strip 1020 can provide a channel into which the alignment tabs on the end caps 904 can index to ensure the profile of the rub strip 1020 and end caps 904 are aligned to create a nearly continuous surface.

The rub strip 1020 illustrated in FIG. 10 is combined with end caps 902 to create a wall guard. The resulting wall guard includes two exposed seams where the rub strip 1020 meets the end caps 902. The seams are relatively small and therefore provide a small target for dust, dirt, or other debris to accumulate.

Figure 11B:
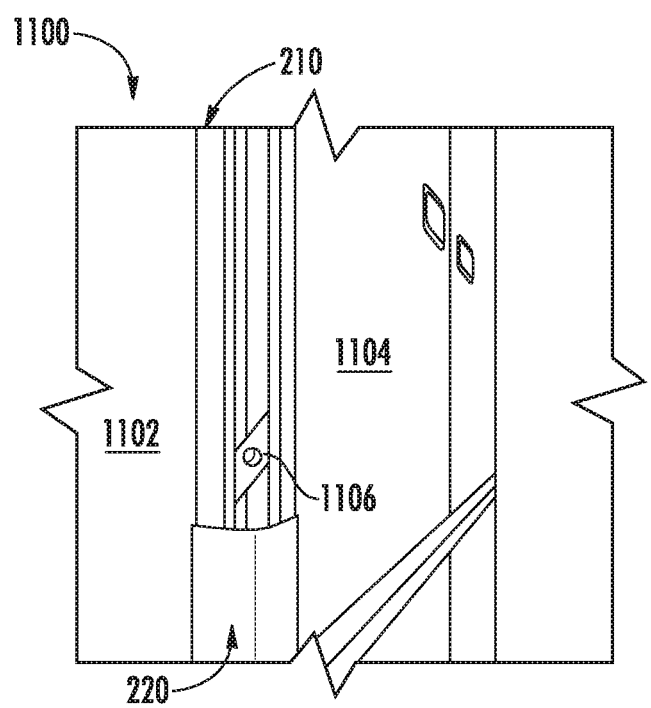
FIG. 11B is a perspective view of the exterior corner of the closet of FIG. 11A after a second step of a process, according to one embodiment, in which a bracket has been installed into the extrusion.
Figure 11C:
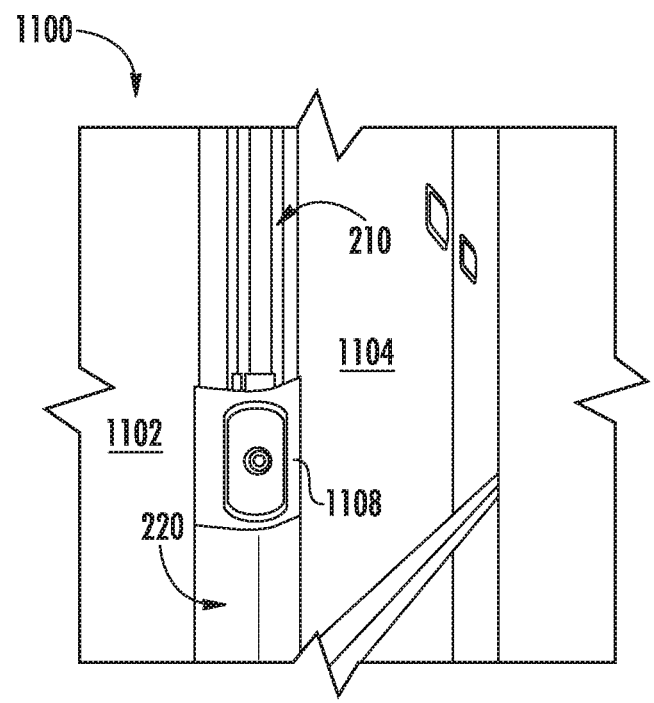
FIG. 11C is a perspective view of the exterior corner of the closet of FIG. 11A after a third step of a process, according to one embodiment, in which a snap fixture has been installed onto the extrusion and the bracket.
Figure 11D:
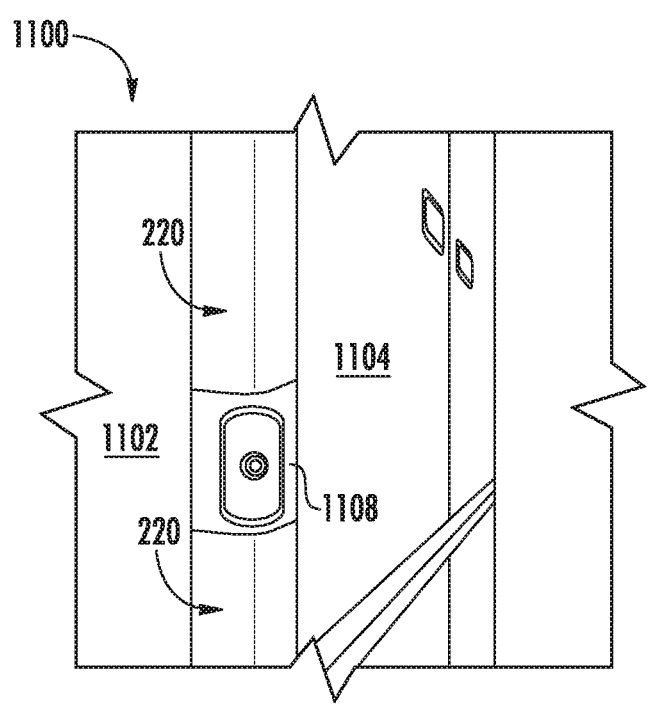
FIG. 11D is a perspective view of the exterior corner of the closet of FIG. 11A after a fourth step of a process, according to one embodiment, in which another vertical rub strip according to the aspect depicted in FIG. 4 has been installed above the snap fixture.

In the aspects discussed above, the various rub strips are attached in a continuous manner along a length of a retaining rail and/or in extrusion. Stated differently, the rub strips do not require an alignment of tabs in slots or the like for attachment to the retaining rails and/or the extrusions. As a result, the rub strips can be easily installed in the retaining rails and/or the extrusions. Furthermore, because the rub strips do not require an alignment of attachment features at particular locations, the rub strips can be easily modified to incorporate additional features. As an example, FIGS. 11A-11D are perspective views that illustrate steps for installing a curtain snap on the extrusion 210 on a corner of a monument 1100. FIG. 11A illustrates the monument 1100 that includes a wall panel 1102 and a door panel 1104 that are attached to the extrusion 210. In FIG. 11A, a first vertical rub strip 220 has been installed in the extrusion (as discussed above with reference to FIG. 5) along a portion of a length of the extrusion 210. In FIG. 11B, a bracket 1106 is installed in the extrusion. For example, the bracket 1106 may be welded, glued, or otherwise affixed between the first planar surface 304 of the spar 302 and the third surface 312 of the rub strip protrusion 310 of the extrusion 210. In FIG. 11C, a curtain snap housing 1108 is installed over the extrusion 210 at a location such that a bottom end of the curtain snap housing 1108 abuts the top end of the first vertical rub strip 220. The curtain snap housing 1108 may be fastened to the bracket 1106 via bolts, a clamp, or other fastener. In FIG. 11D, a second vertical rub strip 220 is attached to the extrusion 210 above the curtain snap housing 1108. The second vertical rub strip 210 is attached at a location such that a bottom end of the second vertical rub strip 210 abuts a top end of the curtain snap housing 1108. As discussed above, because the vertical rub strips 220 are attached in a continuous manner to the extrusion 210 (e.g., without the use of slots and tabs or other location-dependent fastening means), the vertical rub strips 220 can simply be cut to length and attached to the extrusion 210.

FIGS. 12A-12D are perspective views that illustrate steps for installing a light fixture on the extrusion 210 on a corner of the monument 1100. FIG. 12A illustrates that the extrusion 210 has been modified to include a slot 1202 passing through at least the rub strip protrusion 310 of the extrusion 210. The slot 1202 can be used to pass wiring to power a light fixture. FIG. 12B illustrates that brackets 1204 have been installed in the extrusion 210. Similar to the bracket 1106 discussed above with reference to FIGS. 11A-11D, the brackets 1204 may be welded, glued, or otherwise affixed between the first planar surface 304 of the spar 302 and the third surface 312 of the rub strip protrusion 310 of the extrusion 210. FIG. 12B also illustrates that an aperture 1206 has been cut through the vertical rub strip 220, which has been attached to the extrusion 210. As discussed above, because the vertical rub strip 220 is attached in a continuous manner to the extrusion 210, the vertical rub strip 220 can simply be cut to length and the aperture 1206 can be cut at the desired location for the light fixture along the length of the vertical rub strip 220. FIG. 12C illustrates a light housing 1218 installed in the aperture 1206. The light housing 1218 may be fastened to the brackets 1204 via bolts, clamps, or other fasteners. The light housing 1218 includes an aperture 1210 through which electrical wiring can be accessed. The light housing 1218 also includes fastener holes 1212. FIG. 12D illustrates a light 1214 installed in the light housing. The light 1214 may be affixed to the light housing 1218 using fasteners 1216 (e.g., bolts) engaged with the fastener holes 1212 in the light housing 1218.

In the aspects described herein, rub strips can be attached to wall surfaces and/or corner surfaces with little to no cutting or trimming required. Additionally, as discussed above, the rub strips are attached to the various retaining rails and/or extrusions in a continuous manner such that the rub strips do not have to be aligned with discrete fasteners (e.g., slots and tabs). As a result, the aspects described herein result in reduced assembly time and cost. Additionally, in the aspects described herein, the resulting rub strips (i.e., wall guards) include a small number of exposed and/or visible seams, thereby providing a cleaner visual appearance and fewer locations that could collect dirt and/or other debris.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. A vertical rub strip, comprising:
    an elongate body defining a lengthwise direction, the elongate body including:
        an interior side and an exterior side opposite the interior side;
        a center portion defining an arcuate surface that curves toward the interior side;
        a first straight portion arranged on a first side of the center portion; and
        a second straight portion arranged on a second opposing side of the center portion;
    a first retention tab extending from the arcuate surface of the interior side of the elongate body along the lengthwise direction, wherein the first retention tab includes a first outward-facing notch;
    a second retention tab extending from the arcuate surface of the interior side of the elongate body along the lengthwise direction, wherein the second retention tab includes a second outward-facing notch; and a first alignment protrusion and a second alignment protrusion extending from the interior side of the elongate body, wherein the first alignment protrusion extends from a transition between the center portion and the first straight portion, and the second alignment protrusion extends from a transition between the center portion and second straight portion of the elongate body.

2. The vertical rub strip of claim 1, wherein the first retention tab and the second retention tab comprise nylon polymer.

3. The vertical rub strip of claim 1, further comprising:
a first lip protruding from a first end of the first straight portion along the lengthwise direction toward the interior side of the elongate body; and
a second lip protruding from a second end of the second straight portion along the lengthwise direction toward the interior side of the elongate body.

4. A vertical rub strip, comprising:
an elongate body defining a lengthwise direction, the elongate body including:
an interior side and an exterior side opposite the interior side;
a center portion defining an arcuate surface that curves toward the interior side;
a first straight portion arranged on a first side of the center portion; and
a second straight portion arranged on a second opposing side of the center portion;
a first retention tab that extends from the arcuate surface of the interior side of the elongate body and includes a first outward-facing notch formed as an angled kink at an end of the first retention tab;
a second retention tab that extends from the arcuate surface of the interior side of the elongate body and includes a second outward-facing notch formed as an angled kink at an end of the first retention tab;
a first alignment nub and a second alignment nub extending from the interior side of the elongate body, wherein the first alignment nub extends from a transition between the center portion and the first straight portion, and the second alignment nub extends from a transition between the center portion and second straight portion of the elongate body.

5. The vertical rub strip of claim 4, wherein the first retention tab and the second retention tab comprise nylon polymer.

6. The vertical rub strip of claim 4, further comprising:
a first lip protruding from a first end of the first straight portion along the lengthwise direction toward the interior side of the elongate body; and
a second lip protruding from a second end of the second straight portion along the lengthwise direction toward the interior side of the elongate body.

7. The vertical rub strip of claim 1, further comprising a first lip protruding from a first end of the first straight portion along the lengthwise direction toward the interior side of the elongate body.

8. The vertical rub strip of claim 7, wherein the first retention tab comprise nylon polymer.

9. The vertical rub strip of claim 7, wherein the second retention tab comprise nylon polymer.

10. The vertical rub strip of claim 1, further comprising a second lip protruding from a second end of the second straight portion along the lengthwise direction toward the interior side of the elongate body.

11. The vertical rub strip of claim 10, wherein the first retention tab comprise nylon polymer.

12. The vertical rub strip of claim 10, wherein the second retention tab comprise nylon polymer.

13. The vertical rub strip of claim 2, further comprising:
a first lip protruding from a first end of the first straight portion toward the interior side of the elongate body; and
a second lip protruding from a second end of the second straight portion toward the interior side of the elongate body.

14. The vertical rub strip of claim 2, further comprising:
a first lip protruding from a first end of the first straight portion along the lengthwise direction toward the interior side of the elongate body; and
a second lip protruding from a second end of the second straight portion along the lengthwise direction toward the interior side of the elongate body.

15. The vertical rub strip of claim 5, further comprising:
a first lip protruding from a first end of the first straight portion along the lengthwise direction toward the interior side of the elongate body; and
a second lip protruding from a second end of the second straight portion along the lengthwise direction toward the interior side of the elongate body.

16. The vertical rub strip of claim 5, further comprising:
a first lip protruding from a first end of the first straight portion along the lengthwise direction toward the interior side of the elongate body.

17. The vertical rub strip of claim 5, further comprising:
a second lip protruding from a second end of the second straight portion along the lengthwise direction toward the interior side of the elongate body.

18. The vertical rub strip of claim 4, further comprising:
a first lip protruding from a first end of the first straight portion.

19. The vertical rub strip of claim 4, further comprising:
a second lip protruding from a second end of the second straight portion toward the interior side of the elongate body.

20. The vertical rub strip of claim 5, further comprising:
a first lip protruding from the first straight portion; and
a second lip protruding from the second straight portion.

* * * * *